US009183018B2

(12) United States Patent  
Jennings et al.

(10) Patent No.: US 9,183,018 B2  
(45) Date of Patent: Nov. 10, 2015

(54) DYNAMIC ON/OFF JUST-IN-TIME COMPILATION IN A DYNAMIC TRANSLATOR USING INSTRUCTION CODE TRANSLATION

(71) Applicants: Andrew T Jennings, Minnetonka, MN (US); Charles R Caldarale, Roseville, MN (US); Gregory Heimann, Roseville, MN (US); Maurice Marks, Roseville, MN (US); Kevin Harris, Nashua, NH (US)

(72) Inventors: Andrew T Jennings, Minnetonka, MN (US); Charles R Caldarale, Roseville, MN (US); Gregory Heimann, Roseville, MN (US); Maurice Marks, Roseville, MN (US); Kevin Harris, Nashua, NH (US)

( * ) Notice: Subject to any disclaimer, the term of this patent is extended or adjusted under 35 U.S.C. 154(b) by 52 days.

(21) Appl. No.: 14/143,297

(22) Filed: Dec. 30, 2013

(65) Prior Publication Data

US 2015/0186166 A1 Jul. 2, 2015

(51) Int. Cl.
*G06F 9/44* (2006.01)
*G06F 9/455* (2006.01)

(52) U.S. Cl.
CPC .......... *G06F 9/45504* (2013.01); *G06F 9/4552* (2013.01)

(58) Field of Classification Search
CPC ........................... G06F 9/4552; G06F 9/45504

USPC .......................................................... 717/136
See application file for complete search history.

(56) References Cited

U.S. PATENT DOCUMENTS

| 6,142,682 A * | 11/2000 | Skogby ........................... 703/26 |
| 6,718,539 B1 * | 4/2004 | Cohen et al. ................... 717/136 |
| 6,862,650 B1 * | 3/2005 | Matthews et al. ................. 711/6 |
| 2004/0044880 A1 * | 3/2004 | Altman et al. ................. 712/209 |
| 2009/0172713 A1 * | 7/2009 | Kim et al. ...................... 719/331 |

* cited by examiner

*Primary Examiner* — Ryan Coyer
(74) *Attorney, Agent, or Firm* — Richard J. Gregson

(57) ABSTRACT

Systems and methods for executing non-native instructions in a computing system having a processor configured to execute native instructions are provided. A dynamic translator uses instruction code translation in parallel with just-in-time (JIT) compilation to execute the non-native instructions. Non-native instructions may be interpreted to generate instruction codes, which may be stored in a shadow memory. During a subsequent scheduling of a non-native instruction for execution, the corresponding instruction code may be retrieved from the shadow memory and executed, thereby avoiding reinterpreting the non-native instruction. In addition, the JIT compiler may compile instruction codes to generate native instructions, which may be made available for execution, further speeding up the execution process. A system implementing the aforementioned translator may improve performance and speed associated with executing non-native instructions by optimizing the use of instruction codes and JIT-compiled native instructions corresponding to the instruction codes when executing the non-native instructions.

17 Claims, 23 Drawing Sheets

DYNAMIC ON/OFF JUST-IN-TIME COMPILATION IN A DYNAMIC TRANSLATOR USING INSTRUCTION CODE TRANSLATION

FIELD OF DISCLOSURE

The instant disclosure relates to emulated environments. More specifically, this disclosure relates to a dynamic translation system that utilizes instruction code translation and just-in-time (JIT) compilation.

BACKGROUND

In the past, software applications were supported by mainframe data processing systems. Such software applications may include those associated with, for example, utility, transportation, finance, government, and military installations and infrastructures. Applications were supported by mainframe systems because mainframes provide a large degree of data redundancy, enhanced data recoverability features, and sophisticated data security features.

As smaller "off-the-shelf" commodity data processing systems such as personal computers (PCs) have increased in processing power, these PCs have begun providing for these industry's data processing needs. Groups of these PCs may be networked together to increase capability. For instance, one or more personal computers may be interconnected to redundantly provide access to "legacy" data that was previously stored and maintained using a mainframe system. The personal computers may also be used to update this legacy data.

To assist in the conversion of an application from a mainframe environment to a PC environment, an emulator may execute on the PC to allow execution of the mainframe application without additional work from programmers to make the mainframe application compatible with a PC. The emulator may perform dynamic translation on a "register-to-register" basis. In other words, the emulator is implemented in a loop, where each non-native instruction of the mainframe application would be fetched, that non-native instruction would be translated to one or more native instructions performing analogous functionality, and those native instructions executed, with results then stored in a register or memory. The emulator would then fetch and execute a subsequent non-native instruction in the same manner.

Dynamic translation systems have some advantages over static translation systems, for example in that they do not require non-native code to be pre-translated to native instructions. Because the particular instructions that will be executed are generally not known until runtime (when various branches are computed and assessed), static translation can result in translation of non-native code that is not ultimately executed. However, dynamic translation systems also have drawbacks. These drawbacks primarily relate to the time required to translate each non-native instruction to native instructions during execution of the non-native code. In particular, dynamic translation requires retrieval and parsing of non-native instructions, to determine the portions of the non-native instructions that are relevant to the system, including the opcode, source, and destination data locations (e.g., registers or memory locations). Once parsed, the correct code sequence can be selected for use with the corresponding opcode, and the analogous source and destination storage locations assessed and used.

As such, improvements that would lead to lowered time required to decode non-native instructions during runtime translation would be desirable.

SUMMARY

In accordance with the following disclosure, the above and other issues are addressed by the following.

In a first aspect, a method for executing non-native instructions in a computing system having a processor configured to execute native instructions is disclosed. The method includes loading a bank of non-native instructions into memory for execution on a processor configured to execute native instructions, and initializing a shadow memory associated with the bank of non-native instructions. The method further includes fetching a non-native instruction, and interpreting the non-native instruction to generate an instruction code to be stored in the shadow memory. The method also includes selecting, based on the instruction code, a precompiled code fragment from which to implement a virtual machine instruction corresponding to the non-native instruction.

In a second aspect, a system for emulating execution of non-native instructions on a computing system having an instruction processor configured to execute native instructions is disclosed. The system includes an instruction processor configured to execute native instructions, and a memory communicatively connected to the instruction processor and configured to store computer-readable instructions. The system further includes a bank of non-native instructions incapable of direct execution on the instruction processor. The system also includes a shadow memory bank having a plurality of shadow memory entries, each of the shadow memory entries corresponding to one of the non-native instructions. The shadow memory entries are configured to store one or more references to precompiled code fragments of native instructions that correspond to the non-native instruction associated with that shadow memory entry. The system also includes a virtualized instruction processor configured to access pointers in the shadow memory bank and direct execution of precompiled code fragments corresponding to instruction codes in the shadow memory bank.

In a third aspect, a system for emulating execution of non-native instructions on a computing system having an instruction processor configured to execute native instructions is disclosed. The system includes an instruction processor configured to execute native instructions, and a memory communicatively connected to the instruction processor. The memory is configured to store computer-readable instructions executable on the instruction processor that, when executed, cause the system to perform a method of executing non-native instructions using the instruction processor. The method includes loading a bank of non-native instructions into memory for execution on a processor configured to execute native instructions, and initializing a shadow memory associated with the bank of non-native instructions. The method further includes fetching a non-native instruction, and interpreting the non-native instruction to generate an instruction code to be stored in the shadow memory. The method also includes selecting, based on the instruction code, a precompiled code fragment from which to implement a virtual machine instruction corresponding to the non-native instruction.

In a fourth aspect, a method for dynamically turning on or off just-in-time compilation in a dynamic translator using instruction code translation includes fetching a non-native instruction from a plurality of non-native instructions, and interpreting the non-native instruction to generate an instruction code. The method may also include determining if the instruction code satisfies a criteria which prohibits compilation of the instruction code, and prohibiting compilation of the instruction code if the criteria is determined to be satisfied. The method may further include implementing a virtual machine instruction corresponding to the non-native instruction based on the instruction code if the criteria is determined to be satisfied.

In a fifth aspect, a computer program product may include a non-transitory computer-readable medium comprising code to perform the steps of fetching a non-native instruction from a plurality of non-native instructions, and interpreting the non-native instruction to generate an instruction code. The medium may also include code to perform the steps of determining if the instruction code satisfies a criteria which prohibits compilation of the instruction code, and prohibiting compilation of the instruction code if the criteria is determined to be satisfied. The medium may further include code to perform the step of implementing a virtual machine instruction corresponding to the non-native instruction based on the instruction code if the criteria is determined to be satisfied.

In a sixth aspect, an apparatus may include a memory, and a processor coupled to the memory. The processor may be configured to perform the steps of fetching a non-native instruction from a plurality of non-native instructions, and interpreting the non-native instruction to generate an instruction code. The processor may also be configured to perform the steps of determining if the instruction code satisfies a criteria which prohibits compilation of the instruction code, and prohibiting compilation of the instruction code if the criteria is determined to be satisfied. The processor may be further configured to perform the step of implementing a virtual machine instruction corresponding to the non-native instruction based on the instruction code if the criteria is determined to be satisfied.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for improved execution of non-native instructions on a native computing system, and in particular using instruction codes defining the non-native instruction to be performed, thereby avoiding at least a portion of the translation process typically required in a loop-based runtime translator used in execution of non-native instructions. By generating such instruction codes during runtime of an instruction translation system, overhead during subsequent execution of those same instructions is greatly reduced. Because it is common to repeat execution of particular code, such increased performance during repeated execution of the same code segment generally can be expected to have an overall beneficial effect on performance.

In addition to using instruction code translation, execution of non-native instructions on a native computing system may also be improved by using a just-in-time (JIT) compiler operating substantially concurrently with the instruction code translator. A dynamic translator utilizing both instruction code translation and JIT compilation may have the flexibility to dynamically choose at runtime between executing the instruction code or the compiled native instruction, therefore possessing additional degrees of freedom to improve the performance of the dynamic translation system. For example, when executing a particular stream of non-native instructions on the native computing system, the dynamic translator may execute a combination of instruction codes and compiled native instructions to achieve improved execution performance and speed because the translator may not be restricted to execution of only instruction codes or only compiled native instructions or neither.

Figure 1:
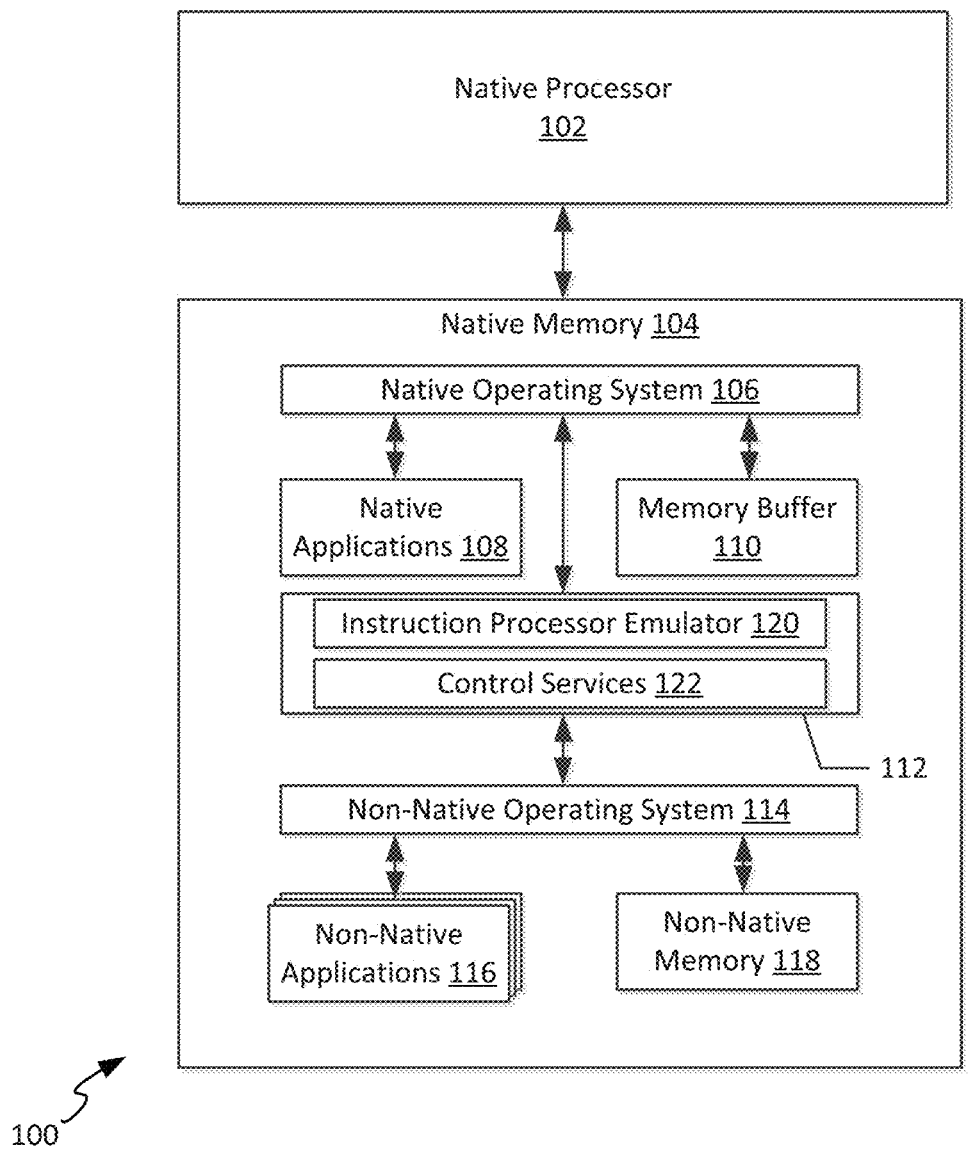
FIG. 1 is a schematic view of an example computing system in which dynamic translation of non-native instructions via instruction codes stored in shadow memory can be implemented.

Referring now to FIG. 1, a logical block diagram of a computing system 100 is shown that can be used to execute non-native code using a dynamic translation system. In other words, the computing system 100 includes hardware and software capable of retrieving non-native instructions (i.e., instructions that are not capable of native execution on a particular computing system's instruction set architecture) and translating those instructions for execution on that computing system's native instruction set architecture. In the embodiment shown, the computing system 100 includes a native instruction processor 102 communicatively connected to a native, physical memory 104.

In the embodiments discussed herein, the processor 102 is generally referred to as a native instruction processor, in that it is a programmable circuit configured to execute program instructions written in a particular, native instruction set architecture. In various examples, the instruction set architecture corresponds to an Intel-based instruction set architecture (e.g., IA32, IA32-x64, IA64, etc.); however, other instruction set architectures could be used.

The memory 104 stores computer-executable instructions to be executed by the processor 102, which in the embodiment shown includes a native operating system 106, native applications 108, a memory buffer 110, and an emulation system 112 hosting one or more non-native components.

The native operating system 106 is generally an operating system compiled to be executed using the native instruction set architecture of the processor 102, and in various embodiments discussed herein, can be a commodity-type operating system configured to execute on commodity hardware. Examples of such an operating system 106 include UNIX, LINUX, WINDOWS, or any other operating systems adapted to operate on a commodity platform.

The native applications 108 can be, for example, any of a variety of applications configured to be hosted by a native operating system 106 and executable on the processor 102 directly. Traditionally, applications 108 correspond to lower-security or lower-reliability applications for which mainframe systems were not traditionally employed. In such an arrangement, memory buffer 110 can be managed by the native operating system 106, and can store data for use in execution of either the native operating system 106 or the applications 108.

The one or more non-native components hosted by the emulation system include a non-native operating system 114, which in turn manages non-native applications 116 and a non-native memory buffer 118. The non-native operating system 114 can be any of a variety of operating systems compiled for execution using an instruction set architecture other than that implemented in the processor 102, and preferably such that the non-native operating system and other non-native applications are incapable of natively (directly) executing on the processor 102. Any of a variety of emulated, non-native operating systems can be used, such that the emulated operating system is implemented using a non-native instruction set architecture. In one possible embodiment, the emulated operating system is the OS2200 operating system provided by Unisys Corporation of Blue Bell, Pa. Other emulated operating systems could be used as well, but generally refer to operating systems of mainframe systems.

The non-native applications 116 can include, for example mainframe applications or other applications configured for execution on the non-native architecture corresponding to the non-native operating system 114. The non-native applications 116 and non-native operating system 114 are generally translated by the emulation system for execution using the native instruction processor 102. In addition, non-native memory buffer 118 allows for management of data in the non-native applications by the non-native operating system, and is an area in memory 104 allocated to a partition including the non-native operating system. The non-native memory buffer 118 generally stores banks of instructions to be executed, loaded on a bank-by-bank basis. One example illustrating this bank memory management process in the context of a dynamic translation system is discussed in U.S. Patent Publication No. 2010/0125554, entitled "Memory Recovery Across Reboots of an Emulated Operating System," filed on Nov. 18, 2008, the disclosure of which is hereby incorporated by reference in its entirety.

The emulation system 112 can be implemented, in some embodiments, as an executable program to be hosted by a native operating system. In an example embodiment, the emulation system is configured as an executable hosted by a Linux operating system dedicated to one processor 102 implementing an Intel instruction set. The emulator also communicates to Linux for Input/output, Memory Management, and clock management services. In some embodiments, this emulation system 112 can be maintained on the computing system effectively as microcode, providing translation services for execution of the non-native instructions.

The emulation system 112 further includes an instruction processor emulator 120 and a control services component 122. The instruction processor emulator 120 generally appears to the non-native operating system 114 as an instruction processor configured to execute using the non-native instruction set architecture. The instruction processor emulator 120 is generally implemented in software, and is configured to provide a conduit between the non-native operating system 114 and non-native applications 116 and the native computing system formed by the instruction processor 102 and native operating system 106. In other words, the instruction processor emulator 120 determines which native instructions to be executed that correspond to the non-native instructions fetched from the instruction bank loaded. For instance, the emulator may include an interpretive emulation system that employs an interpreter to decode each legacy computer instruction, or groups of legacy instructions.

After one or more instructions are decoded in this manner, a call is made to one or more routines that are written in "native mode" instructions that are included in the instruction set of instruction processor 102. Such routines emulate each of the operations that would have been performed by the legacy system, and are collected into native code snippets that can be used in various combinations to implement native versions of the non-native instructions. Another emulation approach utilizes a compiler to analyze the object code of non-native operating system 114 and thereby convert this code from the legacy instructions into a set of native mode instructions that execute directly on processor 102, rather than using precompiled native code snippets. After this conversion is completed, the non-native operating system 114 then executes directly on the processor 102 without any runtime aid of emulator 120. These, and/or other types of emulation techniques may be used by emulator 120 to emulate non-native operating system 114 in an embodiment wherein that operating system is written using an instruction set other than that which is native to processor 102.

Taken together, instruction processor emulator 120 and control services 122 provide the interface between the native operating system 106 and non-native operating system 114. For instance, when non-native operating system 114 makes a call for memory allocation, that call is made via instruction processor emulator 120 to control services 122. Control services 122 translates the request into the format required by an API 124. Native operating system 106 receives the request and allocates the memory. An address to the memory is returned to control services 122, which then forwards the address, and in some cases, status, back to non-native operating system 114 via instruction processor emulator 120. In one embodiment, the returned address is a C pointer (a pointer in the C language) that points to a buffer in virtual address space. Additional details regarding execution of instructions using an emulation system such as system 112 are illustrated below.

Figure 2:
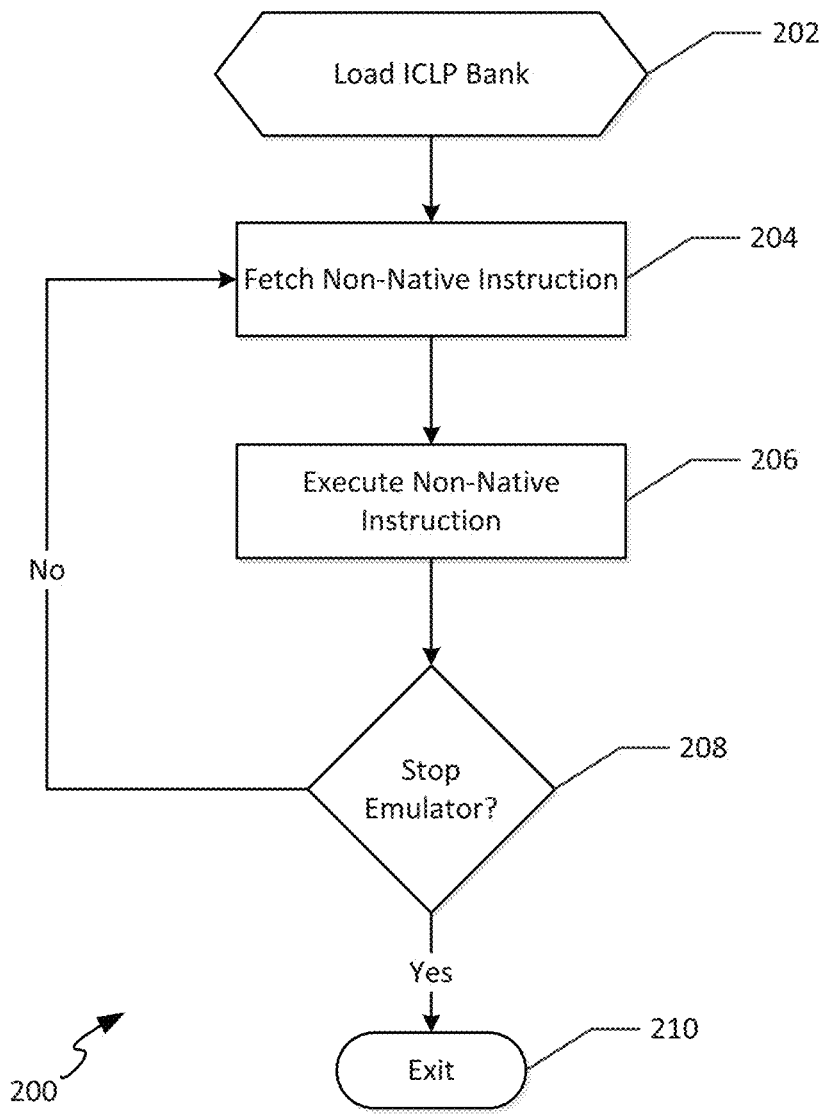
FIG. 2 is a flowchart illustrating an example method by which nonnative instructions can be translated for execution in a computing system.

Referring to FIG. 2, an example method 200 for execution of non-native instructions in the computing system 100 of FIG. 1 is shown. The method 200 is generally performed by the emulation system 112 of FIG. 1, and in particular in cooperation with non-native operating system 114. FIG. 2 specifically illustrates an example of emulated operation of non-native instructions in a manner which requires re-translation of each non-native instruction by the emulation system 112 during operation.

As illustrated in FIG. 2, the method 200 includes loading a bank of nonnative instructions for execution using the emulation system 112 (step 202). This can include, for example, fetching an active instruction bank, as indicated by the non-native operating system 114, and storing that relevant active instruction bank in memory buffer 118 for use by the emulation system 112.

The emulation system 112 will next fetch a non-native instruction from the memory buffer 118 (step 204) and execute that instruction (step 206) by translating the non-native instruction to one or more native instructions. This translation process can include, for example, inspecting the non-native instruction to determine the type of instruction to be performed, as well as the identified registers, memory, or other storage location. This information is then translated to the memory resources on the native computing system for example by selecting a precompiled set of native instructions that execute the corresponding non-native instruction, as well as by selecting associated memory resources to be used to store the resulting data (e.g., back into memory buffer 118).

Instruction translation between non-native instructions and native instructions largely depends upon the particular non-native and native instruction set architectures implemented. In one example embodiment where the non-native instruction set architecture corresponds to an OS2200 architecture and the native architecture corresponds to an Intel instruction set architecture, instructions in a 36-bit word format are parsed on a bit-by-bit basis by the emulation system, and function codes (e.g., opcodes), extended function codes, register operand addresses, index designators, and other features known as published in the OS2200 instruction set can be parsed for determination of corresponding functionality in the Intel instruction set.

Generally, an emulator stop assessment operation determines whether the emulation system 112 is to be stopped (step 208). If the emulation system is to remain in operation, it continues by looping back to step 204 to fetch and execute a next subsequent non-native instruction on the native computing system. Otherwise, the emulation system exits (step 210).

In general, and as noted above, each time a non-native instruction is fetched and executed in the arrangement illustrated in FIG. 2, that non-native instruction must be parsed to determine the specific native instructions to be performed. To avoid the overhead of parsing each non-native instruction in the present disclosure an alternative process is illustrated in FIGS. 3 and 4A-4D in which instruction codes defining the operations to be performed in emulating each non-native instruction are saved in a shadow memory for subsequent execution. Although in an initial pass, this parsing and analysis of each non-native instruction is not avoided, in subsequent executions of the same instructions, overhead is reduced, thereby increasing performance.

Figure 3:
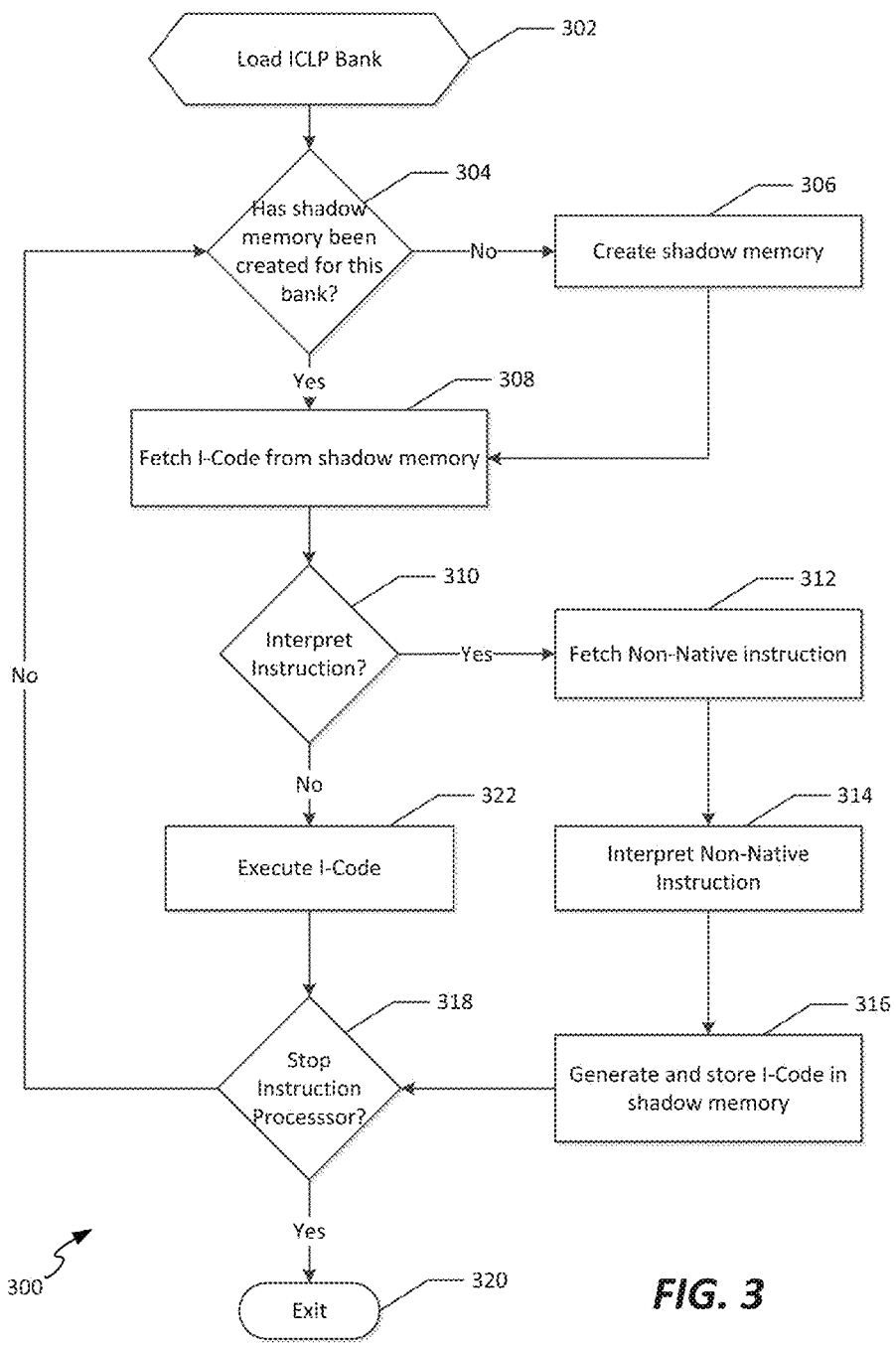
FIG. 3 is a flowchart illustrating an example method by which a shadow memory can be used to improve performance in translating an executing non-native instructions in a computing system.

Referring specifically to FIG. 3, a method 300 is shown in which execution of non-native instructions is provided. The method 300 represents an enhancement on the general loop operation illustrated in FIG. 2, in that a separate memory, referred to herein as a shadow memory, can be used to store pointers to native code used to emulate operation of the corresponding non-native instruction.

In the embodiment shown, the method 300 includes loading a bank of non-native instructions for execution using the emulation system 112 (step 302). This can include, for example, fetching an active instruction bank, as indicated by the nonnative operating system 114, and storing that relevant active instruction bank in memory buffer 118 for use by the emulation system 112. In an example arrangement 400 of memory structures shown in FIG. 4A, an instruction bank 402 is shown, including a plurality of non-native instructions (seen as non-native instructions 1–N).

Figure 4A:
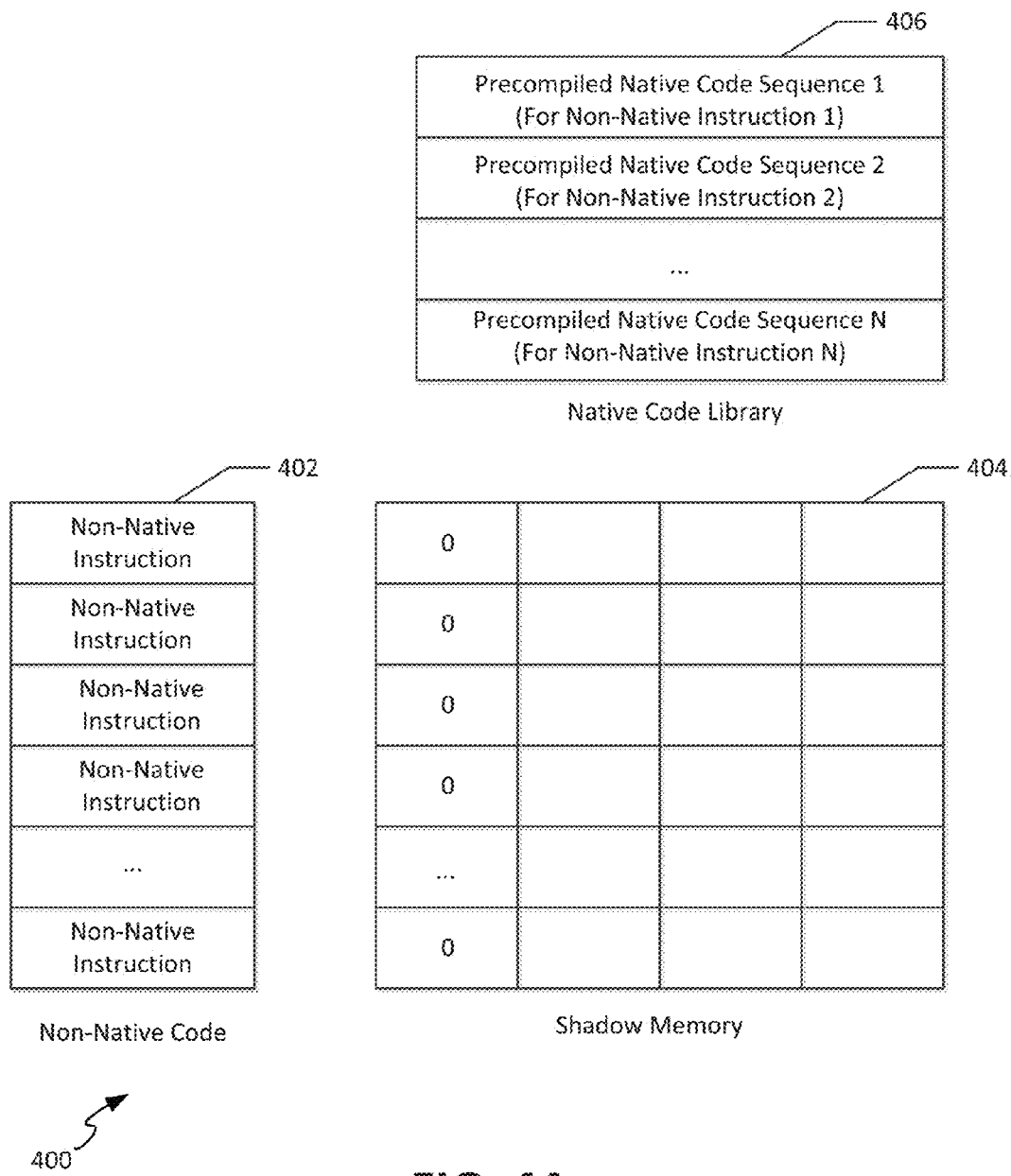
FIG. 4A is a logical diagram of structures used for translated execution of non-native instructions using a shadow memory, according to an example embodiment.
Figure 4B:
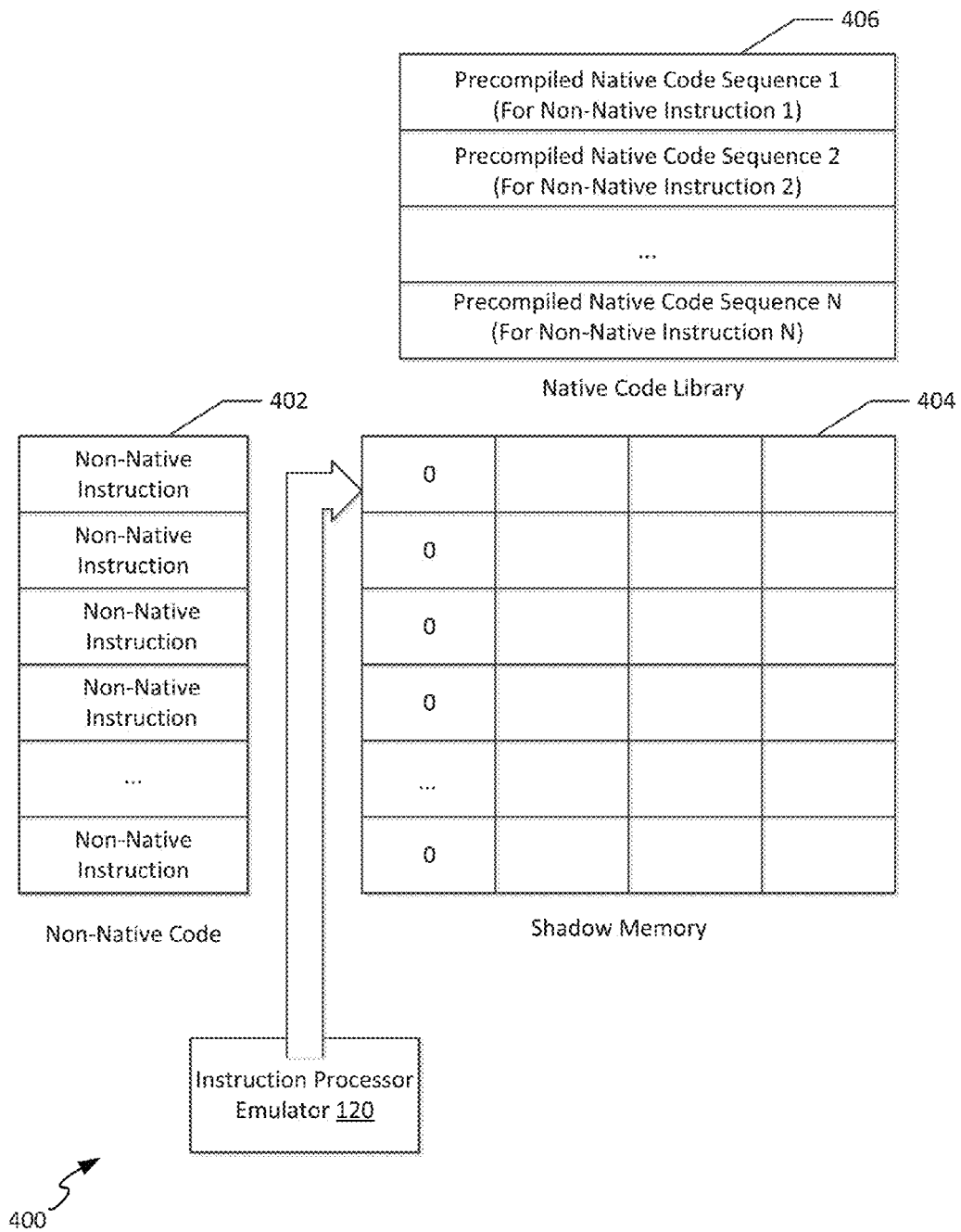
FIG. 4B is a logical diagram illustrating instantiation and initial execution of non-native instructions using a shadow memory, according to the embodiment illustrated in FIG. 4A.

The emulation system 112 will next determine if a corresponding shadow memory has been initialized for use in connection with the loaded instruction bank (step 304). If no shadow memory has been initialized, the shadow memory is created and initialized (step 306). The shadow memory can take any of a variety of forms. In general, and as illustrated in FIG. 4A, a shadow memory 404 is shown which includes a plurality of entries, each of which directly corresponds to one of the nonnative instructions of the instruction bank 402.

In the embodiment shown, each of the entries shadow memory 404 includes a plurality of storage locations capable of storing pointers to locations in native memory that contain precompiled code snippets (collectively illustrated as native code 406) with native instructions that are emulated to execute the corresponding non-native instruction. These storage locations can correspond to data words configured to store pointers to those precompiled code snippets. It is noted that, as illustrated in FIG. 4A, the storage locations in the shadow memory 404 are initialized with values that indicate no correspondence to native code, such as by storing a null pointer, or other invalid pointer location.

In the embodiment shown, after the shadow memory has been initialized, or has been determined to be previously initialized, one or more instruction codes are retrieved from the shadow memory 404 (step 308). The retrieval of instruction codes is performed by the emulation system 112, and in particular the instruction emulator 120, using a virtual instruction register that acts as an instruction pointer to the non-native bank of instructions and associated shadow memory. Any of a variety of addressing modes can be used. In the example embodiment shown, the instruction codes in the shadow memory 404 are arranged for one-to-one correspondence with the instructions in the retrieved bank 402, such that each entry in the shadow memory 404 (including up to four pointer locations) corresponds to a particular non-native instruction.

The retrieved instruction codes are assessed (step 310) to determine whether the instruction codes represent valid pointers to precompiled code snippets in the native code 406. If the instruction codes are not valid (e.g., assuming recent initialization and storage of null pointers, or other pointers indicating that the shadow memory is not populated with valid values), the emulation system 112 will then retrieve the corresponding non-native instruction from the loaded memory bank 402 (step 312). The emulation system 112 will interpret the non-native instruction, for example by parsing the instruction to determine the operation to be performed based on that instruction, as well as the memory storage locations to be used (step 314). This interpreted execution of a non-native instruction corresponds to the traditional execution of a non-native instruction as illustrated in FIG. 2 (step 206).

Alongside interpreted execution of a particular non-native instruction by the emulation system 112, that emulation system will also determine one or more instruction codes that define the non-native instruction (step 316). Instruction codes, which can include both primary and secondary instruction codes, are generated on the first execution of the non-native instruction by executing that instruction in an interpretive mode of the emulator (e.g., as illustrated in FIG. 2, and examining changes to the dynamic state of the instruction processor (e.g., to determine changes to state of registers, and resources used). The generated instruction code produces equivalent state transitions to those detected in the dynamic state of the instruction processor during interpreted execution. This can include changes to instruction code, designator registers, and register configurations.

The instruction codes used in the shadow memory 404 can describe differing types of information, in various embodiments. For example, a primary instruction code can correspond to the function code of the non-native instruction (e.g., fetch, jump, store, etc.), while secondary instruction codes can be used to modify those primary instruction codes, to provide special iterations of those non-native instructions that can be performed using a small additional native code snippet from native code 406. For example, a store instruction, and an add/store instruction, may have the same primary instruction code, but the add/store instruction may include an additional secondary instruction code designed to provide that additional functionality. In addition, the shadow memory can be used to store other attributes of the non-native instruction, such as information about registers or memory pointers to locations where source data can be located or result data is to be stored.

Figure 4C:
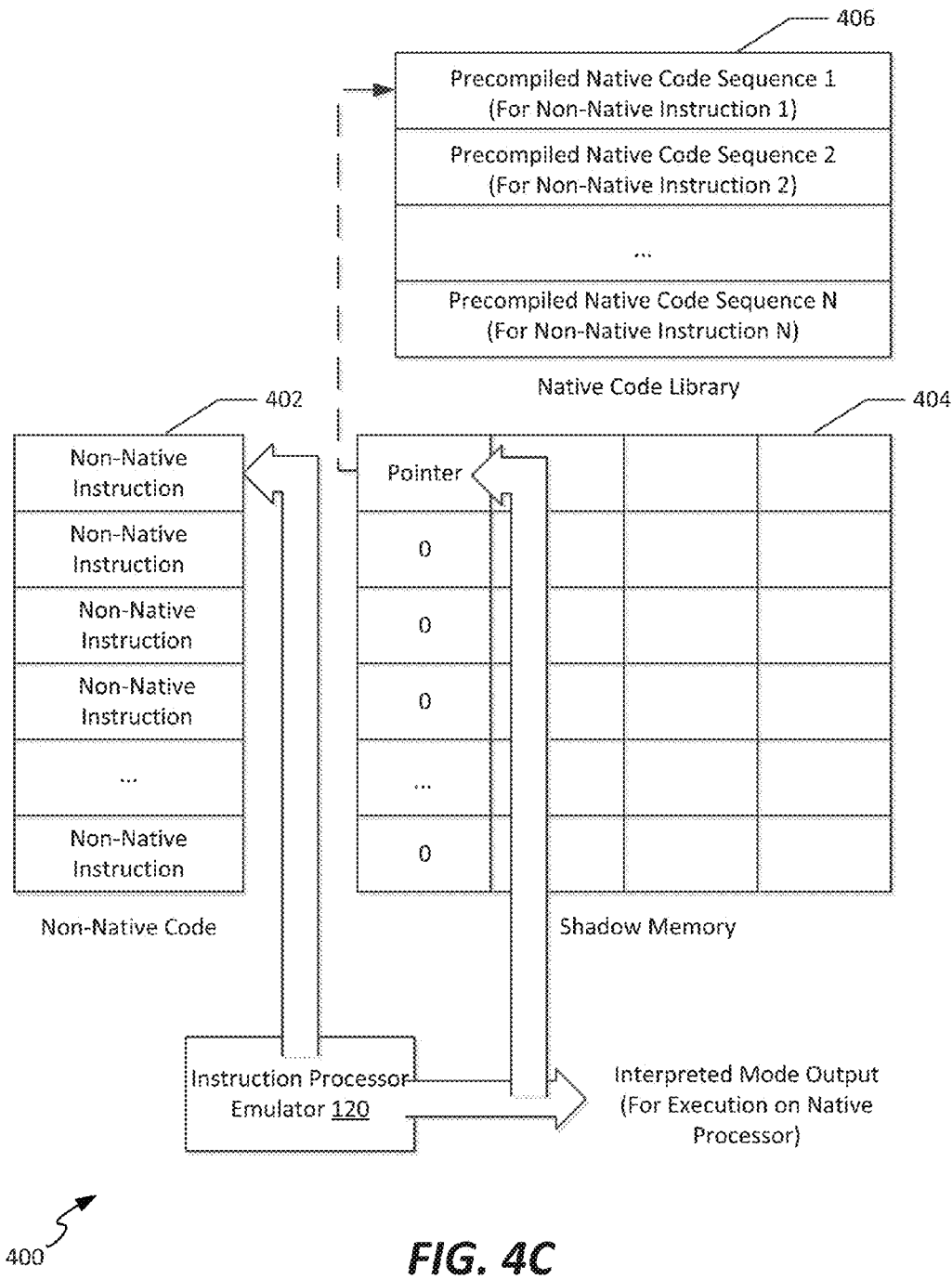
FIG. 4C is a logical diagram illustrating population of the shadow memory during emulated execution of non-native instructions for subsequent execution directly from the shadow memory, according to an example embodiment.

Because the emulation system 112 is required to parse each non-native instruction during traditional emulated execution, the result of this process is captured, and a correspondence is determined between the non-native instruction and precompiled code snippets available to the emulation system. As shown in FIG. 4C, pointers to the precompiled code snippets are stored in the pointer storage locations in the particular shadow memory entry associated with the non-native instruction.

If execution of the bank of instructions using the emulation system 112 is to continue, operational flow returns to step 304, for operation based on the next nonnative instruction to be executed. However, if execution of the bank of instructions is terminated, the instruction processor is halted (step 320).

It is noted that, during subsequent passes through the method 300, if an instruction is determined to not require interpretation (since a valid instruction code entry exists in the shadow memory 404), from step 310, operational flow proceeds to an operation in which the emulation system executes directly from the shadow memory. In such circumstances, the shadow memory already contains a pre-translated set of one or more pointers to native code that provide analogous functionality to the non-native instruction. In particular, the Instruction Codes in shadow memory are used to select precompiled code fragments which implement the virtual machine instructions.

Figure 4D:
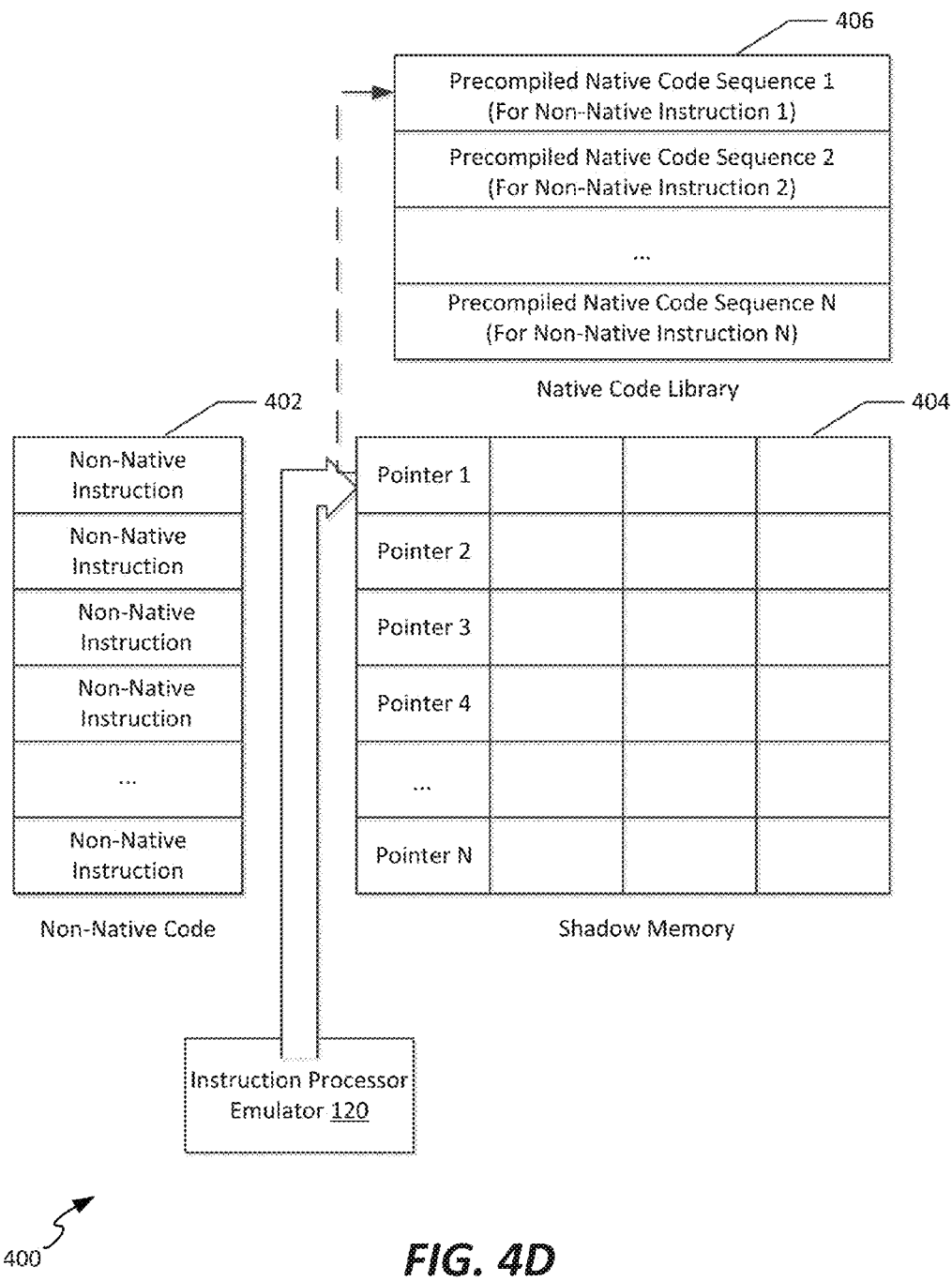
FIG. 4D is a logical diagram illustrating subsequent execution directly from shadow memory.

As illustrated in FIG. 4D (illustrating a fully populated shadow memory), during second and subsequent passes through instructions in an instruction bank, execution can occur directly from the shadow memory 404, rather than from the bank of non-native instructions 402. For example, the non-native code can be executed by stepping through shadow memory 404 and branching to each code fragment in the native code 406. In this way, translation processes can be avoided, and execution can simply be accomplished by stepping through a listing of pointers to native code snippets 406 that, when executed in a particular order defined in shadow memory, perform analogous operations to the code in the loaded bank of instructions 402.

It is noted that, once a shadow memory 404 is populated, there may be one or more circumstances in which that shadow memory can be invalidated, such that subsequent execution must re-create the shadow memory. These circumstances can include, for example, cases in which non-native code is configured to overwrite the non-native instructions in the bank 402, or where an incorrect address register assignment is detected, or in the event of an I/O write to the bank of memory is detected. Since the emulation system 112 and non-native operating system 114 manage data storage and access to non-native memory and non-native applications, a flag can be set in one or both systems to indicate the occurrence of an event that would invalidate a populated shadow memory.

Figure 5:
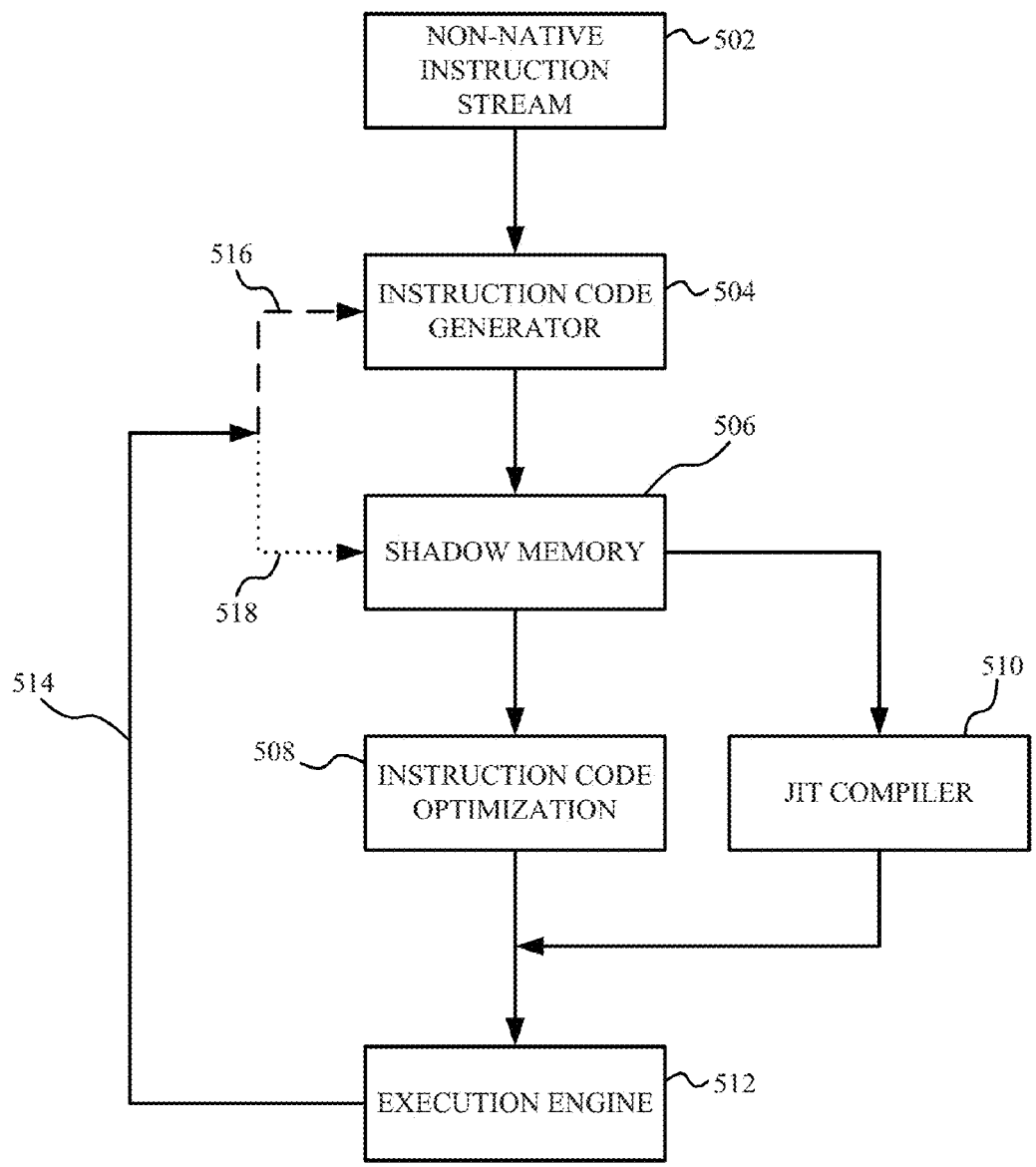
FIG. 5 is a flow chart illustrating the data movement when executing non-native instructions in a computing system having a processor configured to execute native instructions according to one embodiment of the disclosure.

FIG. 5 is a flow chart illustrating the movement of data when executing non-native instructions in a computing system having a processor configured to execute native instructions according to one embodiment of the disclosure. The data movement illustrated in FIG. 5 may correspond to the movement of data in a dynamic translator that utilizes both instruction code translation and JIT compilation to execute instructions in a computing system. At block 502, a plurality of non-native instructions may be stored in non-native memory, such as non-native memory 118. The plurality of non-native instructions stored in the non-native memory may include a non-native instruction stream containing the non-native instructions that may be executed with a processor configured to execute native instructions, such as native processor 102.

At block 504, non-native instructions from non-native memory may be fetched and interpreted to generate instruction codes. According to one embodiment, the instruction code generator at block 504 may include an interpreter system, such as emulation system 112, that translates a non-native instruction to one or more instruction codes that define the operations performed by the non-native instruction in a format that can be understood by the native processor.

At block 506, the instruction codes generated by the instruction code generator may be stored in shadow memory, such as shadow memory 404. In one embodiment, the instruction codes in the shadow memory may be optimized, such as at block 508, prior to being executed by an execution engine at block 512, such as the native processor 102. In some embodiments, the instruction code optimization performed at block 508 may modify an instruction code or a block of instruction codes to more efficiently execute the instruction codes with the execution engine, to execute the instruction codes more rapidly, to execute the instruction codes with less resources, and/or the like.

In some embodiments, at block 510, instruction codes located in shadow memory may be processed with a JIT compiler to generate compiled native instructions. For example, in one embodiment, an instruction code in shadow memory may be compiled with the JIT compiler to generate a native instruction that can be directly executed by an execution engine. In another embodiment, the dynamic translator may include functionality to restrict the compilation, by the JIT compiler, of an instruction considered complex or infrequent, or an instruction necessary for proper operation of the translator itself. Examples of instructions for operation of the translator itself may, in some embodiments, include instructions used to trigger high level JIT compiler behavior, such as path starts or ends or actions for which the JIT compiler may not have sufficient data structures to handle. Based on the configuration of the dynamic translator, the execution engine may execute, at block 512, the native code fragments pointed to by the instruction codes or the execution engine may execute the compiled native instructions generated by the JIT compiler.

Figure 6:
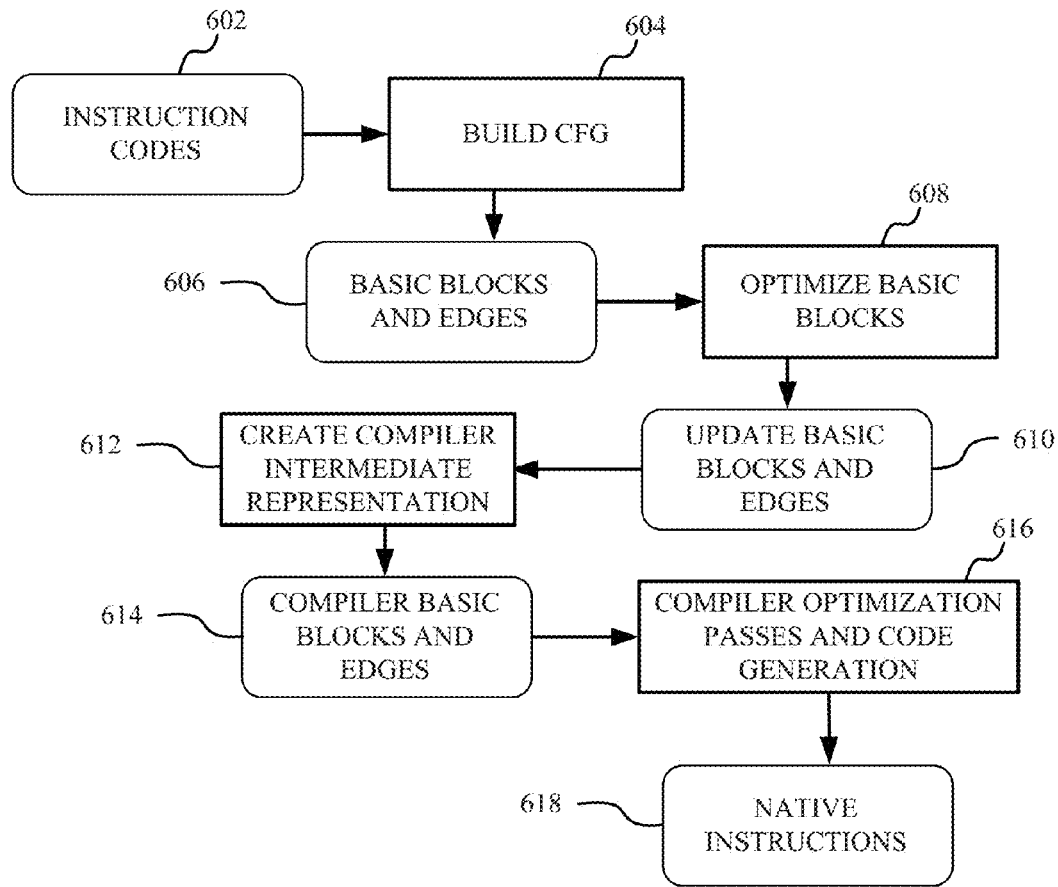
FIG. 6 is a block diagram illustrating the internal organization of a JIT compiler according to one embodiment of the disclosure.

FIG. 6 is a block diagram illustrating the internal organization of a JIT compiler according to one embodiment of the disclosure. In FIG. 6, the boxes with round corners may represent data structures, while the boxes with the square corners may represent logical components that constitute the compilation passes that operate on the data structures. The arrows may also show input data into the passes and output data from the passes. At block 604, a copy of the instruction codes at block 602 may be captured, and each potential instruction code in an instruction code path may be examined to determine whether the potential instruction code can be compiled and how it contributes to the control flow. Furthermore, at block 604, a basic block and edge data structure organization of the instruction codes that constitute the initial control flow graph (CFB) representation of the path may be built, thereby creating, at block 606, the basic block and edge data structure organization of the instruction codes.

In some embodiments, instruction-specific optimization passes may be executed at block 608, exploiting the CFB information, and potentially modifying the CFG in the process, which may correspond to the updated basic blocks and edges at block 610. At block 612, a compiler intermediate representation for an instruction may be created by converting the instruction code representation for the instruction to a compiler intermediate representation for the instruction, which may, in some embodiments, generate a large number of compiler basic blocks and edges, such as the compiler basic blocks and edges at block 614. At block 616, the JIT compiler may optimize instruction codes for JIT compiler compilation and/or the JIT compiler may compile the instruction codes to generate native instructions corresponding to the instruction codes, such as the native instructions at block 618. In some embodiments, the JIT compiler may directly incorporate a source code component of the translator. For example, the JIT compiler may directly incorporate a header file that defines a simulated non-native machine state, such as general registers, base registers, instruction code structure, and/or the like.

Returning to FIG. 5, an instruction may be executed differently between a first time and a subsequent time. For example, in some embodiments, after an instruction is executed with the execution engine at block 512, the flow of a dynamic translator may follow path 514 to execute a subsequent instruction. If the instruction in line for execution has not been previously fetched and interpreted at block 504, then flow may proceed via path 516 to the instruction code generator at block 504 to fetch the instruction in line for execution from the non-native memory and interpret the fetched non-native instruction to generate one or more instruction codes corresponding to the fetched non-native instruction. The generated instruction code may then be stored in the shadow memory 506. Once in the shadow memory 506, the instruction code may be optimized and executed in the execution engine 512. According to another embodiment, the instruction code may be compiled at block 510 with the JIT compiler to generate a native instruction corresponding to the non-native instruction in line for execution, and the generated native instruction may be executed to implement the virtual machine instruction corresponding to the non-native instruction. In other embodiments, both the instruction code and the generated native instruction may be available to the execution engine at block 512, where the dynamic translator makes a decision as to whether execute the instruction code or the JIT compiler-generated native instruction.

In another embodiment, if the instruction in line for execution was previously fetched and interpreted at block 504, then flow from path 514 may proceed via path 518 to the shadow memory 506 to locate the instruction code corresponding to the non-native instruction in line for execution. In some embodiments, because the instruction code has already been previously generated, the JIT compiler-generated native instruction generated by compiling the instruction code may also already be available in the native memory. As before, both the optimized instruction code corresponding to the non-native instruction in line for execution and/or the JIT compiler-generated native instruction corresponding to the non-native instruction in line for execution may be made available to be executed within the execution engine at block 512, where logic may be employed by the dynamic translator to determine whether to execute then instruction code or the JIT compiler-generated native instruction. As evident from the illustration provided in FIG. 5, any subsequent execution of a non-native instruction may be performed without refetching and reinterpretation because the instruction already exists in the shadow memory, which may improve the speed at which a dynamic translator executes instructions because fetching and interpreting non-native instructions are time-consuming tasks.

Figure 7:
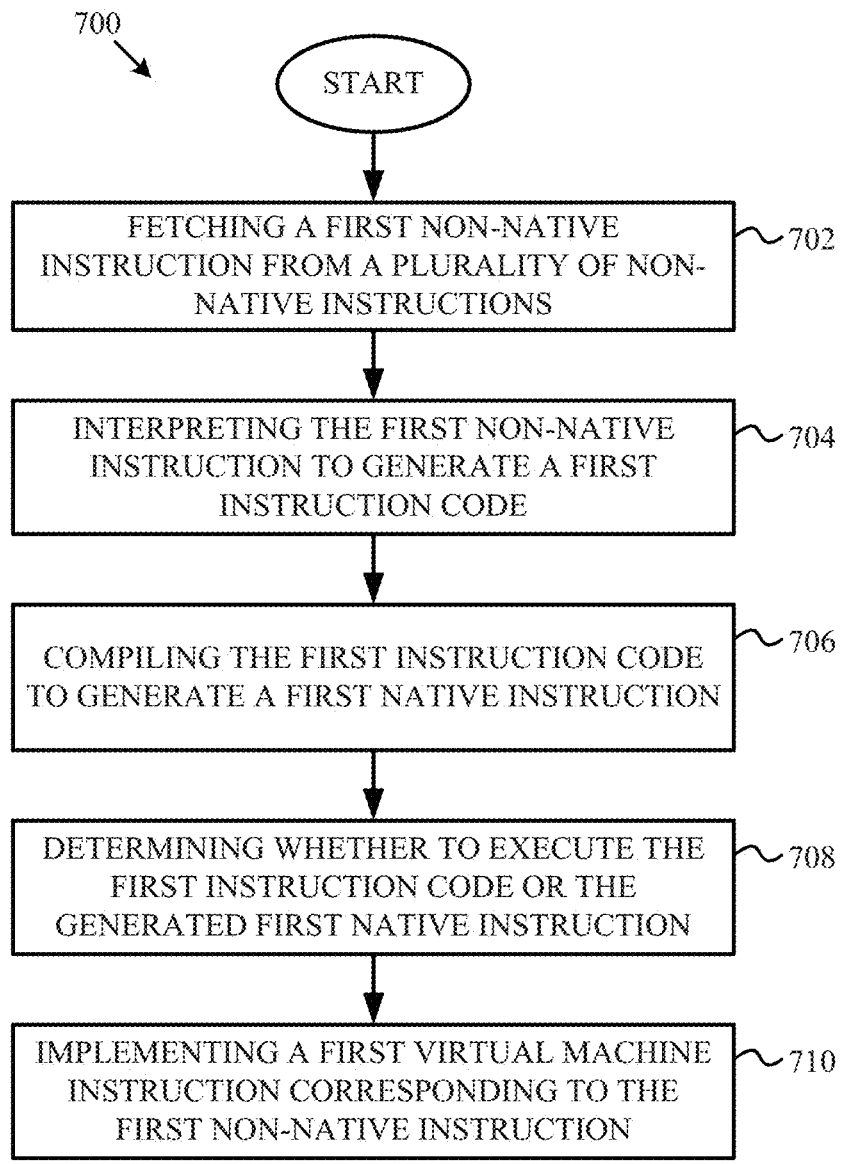
FIG. 7 is a flow chart illustrating a method for executing non-native instructions in a computing system having a processor configured to execute native instructions according to one embodiment of the disclosure.

The details regarding the movement of data illustrated in FIG. 5 may also be understood with the method illustrated in FIG. 7, which is a flow chart illustrating a method for executing non-native instructions in a computing system having a processor configured to execute native instructions according to one embodiment of the disclosure. A method 700 begins at block 702 with fetching a first non-native instruction from a plurality of non-native instructions. At block 704, the first non-native instruction is interpreted to generate a first instruction code, and at block 706 the first instruction code is compiled to generate a first native instruction corresponding to the first non-native instruction. According to an embodiment, actions performed at blocks 702 and 704 may correspond to the actions performed by the instruction code generator at block 504 of FIG. 5, while actions performed at block 706 may correspond to actions performed by the JIT compiler at block 510. In some embodiments, the JIT compiler may retrieve the instruction codes from the shadow memory in order to compile the instruction codes.

At block 708, it is determined whether to execute the first instruction code or the generated first native instruction. For example, in some embodiments, block 708 may include determining if user input has been received specifying that instruction codes should be executed or that compiled native instructions should be executed.

In another example, block 708 may include determining if the JIT compiler has communication capability with the native memory. If, for example, the JIT compiler has communication capability to the native memory and the JIT compiler is not prohibited from storing native instructions in the native memory, then it may be determined that the first native instruction should be executed. However, if the JIT compiler has its communication capability to the native memory disabled or if the JIT compiler is prohibited from storing native instructions in the native memory, then the first instruction code may be executed.

In yet another example, determining whether to execute the first instruction code or the generated native instruction may include determining that configuration parameters associated with the dynamic translator indicate that the instruction code should be executed or determining that configuration parameters associated with the dynamic translator indicate that the native instruction should be executed. In other examples, hardware or software logic may be programmed in various ways to determine whether to execute the first instruction code or the first native code. For example, the hardware and software logic may be programmed based on parameters associated with the dynamic translator, such as user inputs, type of instruction to be executed, location of instruction in memory, and the like.

Method 700 may further includes, at block 710, implementing a first virtual machine instruction corresponding to the first non-native instruction. In one embodiment, the actions performed at block 710 may correspond to actions performed by the execution engine at block 512 of FIG. 5. The implementing of a first virtual machine instruction may be based on the determination of whether to execute the first instruction code or the first native instruction. For example, if a determination is made to execute the first native instruction, then the branch address pointed to by the first instruction code may be replaced with the address of the first native instruction. The first native instruction may then be located by locating the address of the first native instruction in native memory. Upon being located, the first native instruction may be executed. However, tf a determination is made to execute the first instruction code, then the native code fragment pointed to by the first instruction code may be located in the native memory and subsequently executed upon being located.

According to one embodiment, the dynamic translator may function may improve performance and speed by changing subsequent execution calls, such as by not requiring reinterpretation of a non-native instruction scheduled to be executed if the non-native instruction was previously interpreted. For example, the dynamic translator may access the shadow memory to determine if a second instruction code associated with a second non-native instruction scheduled to be executed is located in the shadow memory. If the second instruction code is located in the shadow memory then the second instruction code may be fetched. The dynamic translator operating on the instruction processor may then determine whether to execute the second instruction code or a second native instruction corresponding to the second non-native instruction, where the second native instruction was generated by previously compiling the second instruction code during a previous execution call for the second non-native instruction. Based on the determination of whether to execute the second instruction code or the second native instruction, a second virtual machine instruction corresponding to the second non-native instruction may be implemented.

Improvements in speed and performance may be achieved when the second non-native instruction in line for execution was previously fetched for execution, because then interpretation of the second non-native instruction may not be necessary to execute the second non-native instruction. For example, if the second non-native instruction corresponds to the first non-native instruction, then the second instruction code, which may be the first instruction code called a second time, may be in the shadow memory and quickly fetched for execution without the need to interpret the second non-native instruction, which would amount to reinterpreting the first non-native instruction. Furthermore, because the second instruction code may have already been compiled, such as when the first instruction code was fetched for execution and compiled, there may be no need to recompile the second instruction code to generate the second native instruction because the second native instruction may already be available in the native memory, where it may be located at the address of the first native instruction. Therefore, if the second native instruction is executed to implement the second virtual machine instruction corresponding to the second non-native instruction, then two time consuming operations may have been skipped, such as the interpretation and compiling operations. That is, the implementation of the second virtual machine instruction may correspond to implementing the first virtual machine instruction a second time, except that the instruction code and native instruction may already be readily available. As a result, accessing the shadow memory to fetch the first instruction code in order to implement the first virtual machine instruction corresponding to the first non-native instruction a second time avoids reinterpreting the first non-native instruction to implement the first virtual machine instruction a second time.

According to another embodiment, if the second instruction code is not located in the shadow memory, then the second non-native instruction in line for execution may be fetched from the plurality of non-native instructions. The second non-native instruction may then be interpreted to generate the second instruction code, and the second instruction code may be compiled to generate the second native instruction corresponding to the second non-native instruction. The dynamic translator operating on the instruction processor may then determine whether to execute the second instruction code or a second native instruction corresponding to the second non-native instruction. Based on the determination of whether to execute the second instruction code or the second native instruction, a second virtual machine instruction corresponding to the second non-native instruction may be implemented.

In allowing a dynamic translator to choose between executing instruction codes and compiled native instructions corresponding to the instruction codes, the dynamic translator may merge the JIT compiler into the execution environment in a manner that makes the presence of the JIT compiler in the system transparent. For example, the dynamic translator may execute numerous instruction codes to perform the operations involved in the corresponding non-native instructions, while at the same time, a JIT compiler running in parallel to the instruction code translator is converting sequences or series of instruction codes into native instructions. As execution of the instruction codes continues, when it is determined that a JIT compiled native instruction or group of native instructions should be executed, the JIT compiler simply replaces the address pointed to by the instruction code so that it points to the compiled native instruction. Therefore, even though an instruction processor may think it is executing instruction codes, it may be processing a JIT compiled native instruction or an entire series or group of native instructions.

The merging of the instruction code translator and JIT compiler as described above makes the execution of instruction codes and JIT compiled native instructions a smoother process. For example, rather than requiring that the dynamic translator choose before runtime whether to run in either interpretor mode, in which instruction codes are executed, or in JIT compiler mode, in which JIT compiled native instructions are executed, the dynamic translator may run both of them in parallel and choose at runtime whether execute an instruction code or a JIT compiled native instruction. In addition, because the instruction code translator and the JIT compiler run in an almost parallel fashion, the compilation with the JIT compiler of instruction codes may be completely halted or prohibited without halting the execution of instructions because the instruction codes are still capable of being executed.

Figure 8:
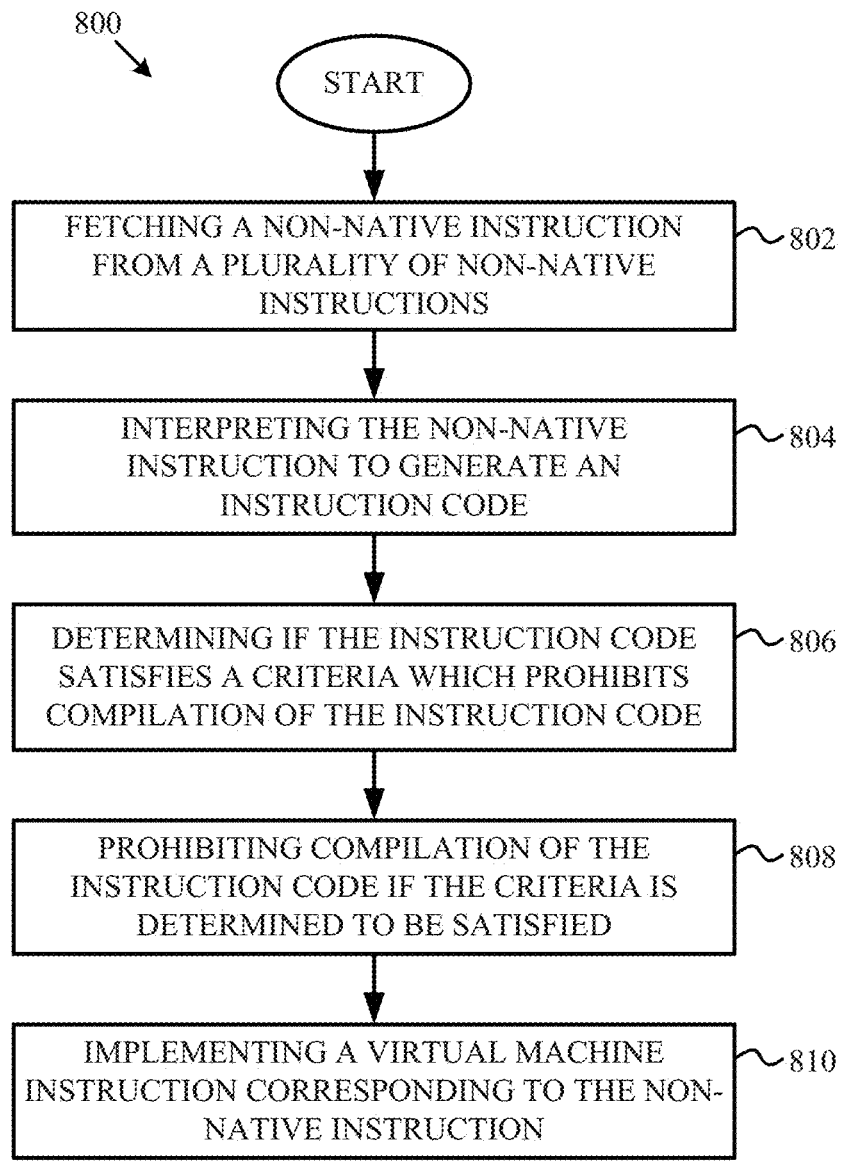
FIG. 8 is a flow chart illustrating a method for dynamically turning on or off just-in-time compilation in a dynamic translator using instruction code translation according to one embodiment of the disclosure.

FIG. 8 is a flow chart illustrating a method for dynamically turning on or off just-in-time compilation in a dynamic translator using instruction code translation according to one embodiment of the disclosure. A method 800 begins at block 802 with fetching a non-native instruction from a plurality of non-native instructions, and, at block 804, interpreting the non-native instruction to generate an instruction code. Method 800 may then proceed to block 806 to include determining if the instruction code satisfies a criteria which prohibits compilation of the instruction code.

The criteria may include a type of instruction, and determining if the criteria is satisfied may include determining if the instruction code is associated with the specified type of instruction. As an example, the type of instruction may be a load instruction or an instruction to add a media. In some embodiments, the type of instruction used for the criteria may be selected based on the customer using the system that utilizes the dynamic translator. Other types of instructions may also be used as the criteria. The criteria may also include a range of addresses in at least one of a shadow memory associated with the plurality of non-native instructions and a non-native memory, and determining if the criteria is satisfied may include at least one of determining if the instruction code is located within the range of addresses in the shadow memory and determining if the non-native instruction is located within the non-native memory.

If the criteria is determined to be satisfied, then, at block 808, compilation of the instruction code may be prohibited, and, at block 810, a virtual machine instruction corresponding to the non-native instruction may be implemented based on the instruction code.

The determination made at block 806 may indicate that the criteria that prohibits compilation of the instruction code is not satisfied. In those embodiments where the criteria is determined to not be satisfied, the instruction code may be compiled to generate a native instruction corresponding to the non-native instruction and a virtual machine instruction corresponding to the non-native instruction may be implemented based on the generated native instruction.

User input may also be used to determine whether to allow or prohibit compilation of the instruction code. For example, if user input specifies that compilation of the instruction code is prohibited, then the dynamic translator may prohibit compilation of the instruction code based on the input. If, on the other hand, user input specifies that compilation of the instruction code is allowed, then the dynamic translator may allow compilation of the instruction code based on the input.

Figure 9:
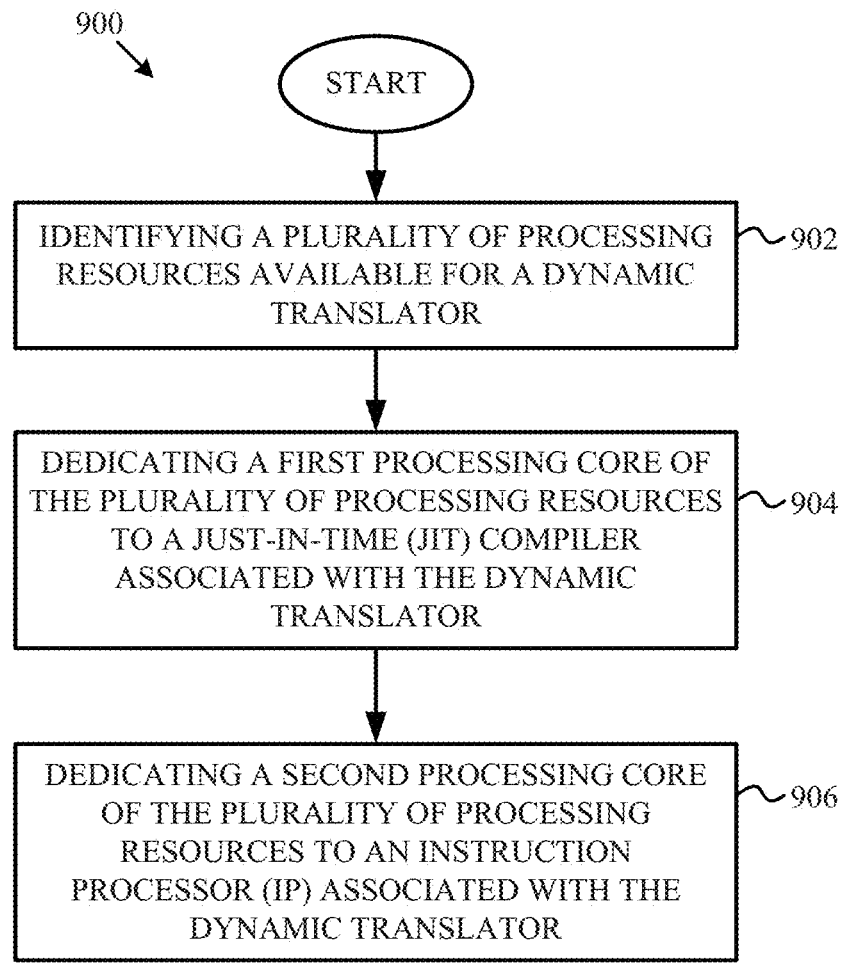
FIG. 9 is a flow chart illustrating a method for dedicating processing resources to just-in-time compilers and instruction processors in a dynamic translator according to one embodiment of the disclosure.

FIG. 9 is a flow chart illustrating a method for dedicating processing resources to just-in-time (JIT) compilers and instruction processors in a dynamic translator according to one embodiment of the disclosure. A method 900 may begin at block 902 with identifying a plurality of processing resources available for a dynamic translator. At block 904, a first processing core of the plurality of processing resources may be dedicated to a JIT compiler associated with the dynamic translator, and at block 906 a second processing core of the plurality of processing resources may be dedicated to an instruction processor (IP) associated with the dynamic translator. In some embodiments, the first processing core may be dedicated to the JIT compiler before the second processing core is dedicated to the IP to increase the likelihood that the JIT compiler is ready when the IP starting executing instructions. In other embodiments, the IP may have its processing core dedicated first or at substantially the same time as when the JIT compiler receives a processing dedicated core. The processing cores dedicated to the IP and the JIT compiler may be turned on or off dynamically.

Non-native instructions may be interpreted with the IP's dedicated processing core to generate instruction codes. These instruction codes may be compiled with the JIT compiler's dedicated processing core to generate native instructions. In some embodiments, dedicating processing cores to particular functions, such as an IP or a JIT compiler, may prohibit the dedicated cores from being interrupted by functions other than those to which they were dedicated. For example, switching overhead may not be allowed to be placed on a processing core dedicated to a JIT compiler. As another example, a processing core dedicated to the IP may be prohibited from handling I/O operations or completions, and the I/O operations and completions may be required to be handled on other cores. In addition, dedicating a first processing core to the JIT compiler and dedicating a second processing core to the IP may prohibit the operations associated with the JIT and the operations associated with the IP from interfering with each other.

With separate processing cores dedicated to an IP and a JIT compiler, the compiling of instruction codes may be performed in parallel with the interpreting of non-native instructions and a dynamic translator executing instructions may then determine whether to execute an instruction code generated with the IP's dedicated processing core or a native instruction generated with the JIT's dedicated processing core. Based on the determination of whether to execute the instruction code or the native instruction, a virtual machine instruction corresponding to a non-native instruction may be implemented.

Figure 10:
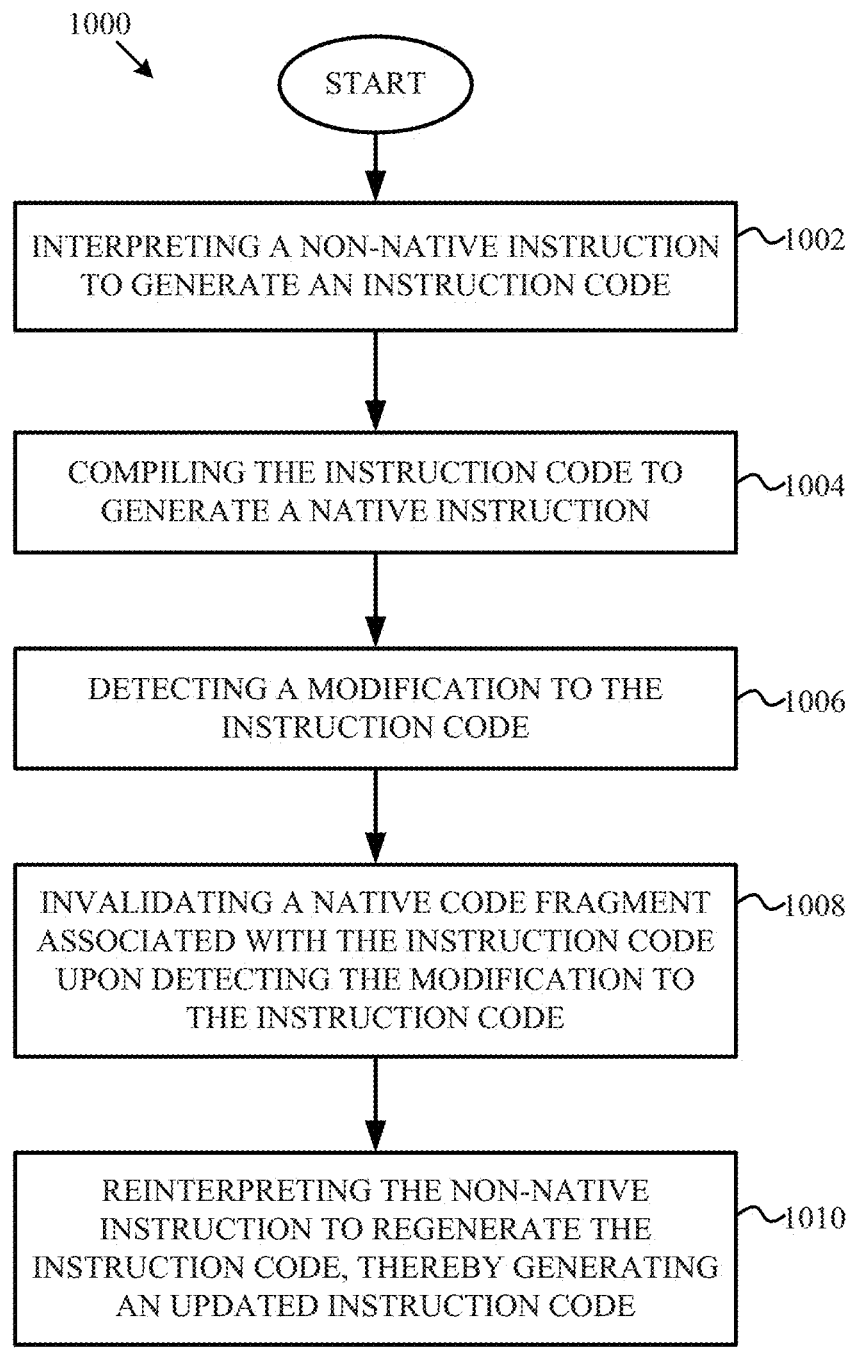
FIG. 10 is a flow chart illustrating a method for updating compiled native instruction paths according to one embodiment of the disclosure.

FIG. 10 is a flow chart illustrating a method for updating compiled native instruction paths according to one embodiment of the disclosure. A method 1000 may begin at block 1002 with interpreting a non-native instruction to generate an instruction code. Then, at block 1004, the instruction code may be compiled to generate a native instruction corresponding to the non-native instruction. At block 1006, method 1000 may include detecting a modification to the instruction code. The modification may be detected by determining if a valid bit associated with the instruction code indicates that the instruction code is invalid. The method 1000 may further include, at block 1008, invalidating a native code fragment associated with the instruction code upon detecting the modification to the instruction code. The native code fragment associated with the instruction code that gets invalidated may also include any native instruction or native instruction path generated by compiling the modified instruction code or a group of instruction codes that includes the modified instruction code.

At block 1010, the method 1000 includes reinterpreting the non-native instruction to regenerate the instruction code, thereby generating an updated instruction code. Reinterpreting the non-native instruction may be performed after invalidating the native code fragment as shown in FIG. 10. However, reinterpreting the non-native instruction may alternatively be performed before or at substantially the same time as invalidating the native code fragment.

A method for updating compiled native instruction paths may also include replacing a branch address pointed to by the modified instruction code. Replacing the branch address pointed to by the modified instruction code may, upon identifying that the modified instruction code is scheduled to be subsequently executed, cause reinterpretation of the non-native instruction in order to regenerate the instruction code. Reinterpretation and regeneration may occur prior to subsequently executing the instruction code.

According to one embodiment, a method for updating compiled native instruction paths may also include determining if an instruction code has been regenerated and recompiling the updated instruction code to generate an updated native instruction corresponding to the non-native instruction if it is determined that the instruction code has been regenerated. According to another embodiment, a method for updating compiled native instruction paths may include determining if the instruction code for which a modification was detected is part of a block of instruction codes compiled as a group to create a native instruction path associated with the block of instruction codes and recompiling the block of instruction codes as a group using the updated instruction code if it is determined that the instruction code for which a modification was detected is in the block of instruction codes. In one embodiment, determining if the instruction code for which a modification was detected is part of a block of instruction codes compiled as a group may include analyzing a quick lockup map that includes addresses of compiled instruction codes compiled by a just-in-time compiler to identify native instruction paths that are associated with blocks of instruction codes that include the instruction code for which a modification was detected.

Figure 11:
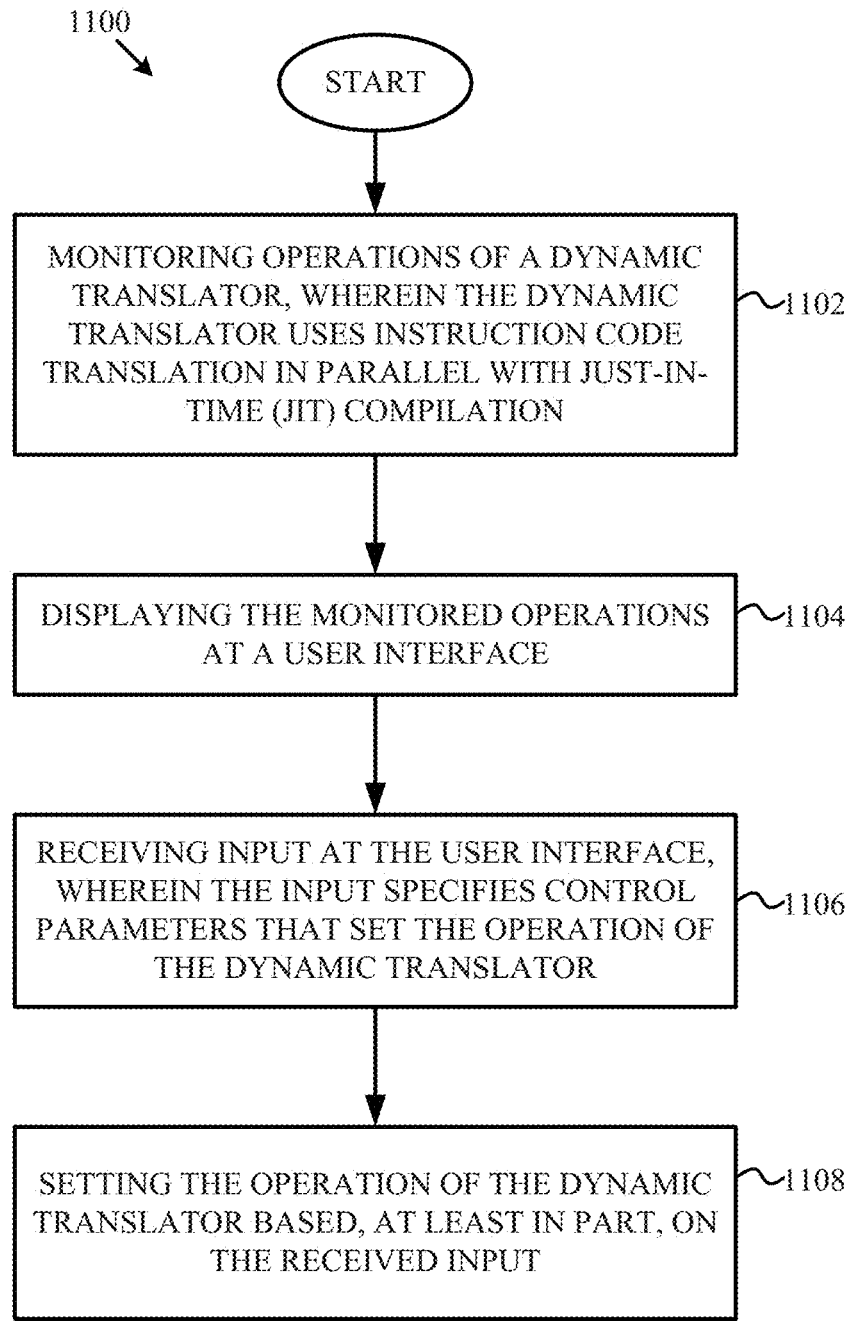
FIG. 11 is a flow chart illustrating a method for displaying and dynamically controlling operations of a dynamic translator according to one embodiment of the disclosure.

FIG. 11 is a flow chart illustrating a method for displaying and dynamically controlling operations of a dynamic translator according to one embodiment of the disclosure. A method 1100 may begin at block 1102 with monitoring operations of a dynamic translator, wherein the dynamic translator uses instruction code translation in parallel with JIT compilation. In some embodiments, the monitored operations may include at least one of system properties and memory usage. In other embodiments, the monitored operations may include at least one of a number of compilations completed, a number of instructions invalidated, and a number of instructions executed. The number of instructions executed may include at least one of the total number of instructions executed and the number of instructions generated by a JIT compiler that are executed.

At block 1104, the monitored operations may be displayed at a user interface. In one embodiment, displaying the monitored operations may include displaying graphical representations of the monitored operations. At block 1106, input may be received at the user interface, where the received input may specify control parameters that set the operation of the dynamic translator. The control parameters may include at least one of execution mode, production mode, compilation mode, execution enabled, and authorization level. At block 1108, the operation of the dynamic translator may be set based on the received input. Although not shown, the method 1100 may also include processing the input received at the user interface, such as at block 1106, with a processing core separate from any processing core executing a JIT compiler or an IP.

Figure 12:
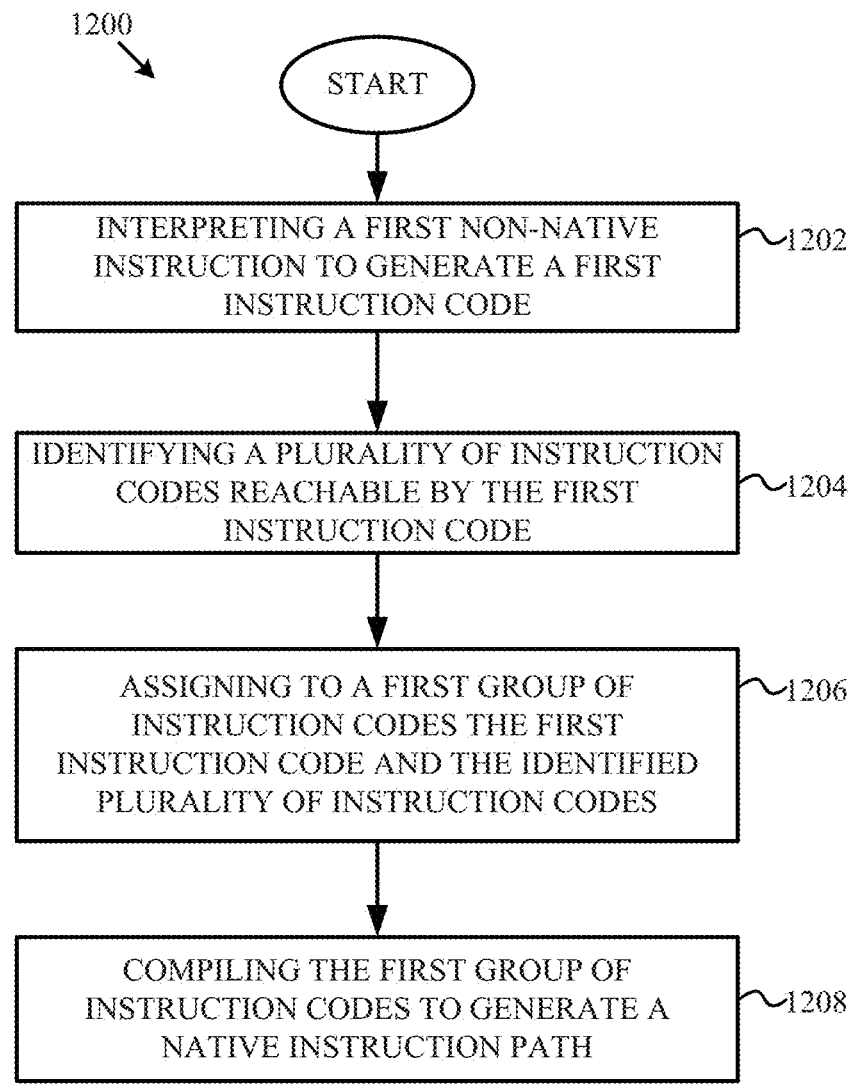
FIG. 12 is a flow chart illustrating a method for defining an instruction path to be compiled by a just-in-time compiler according to one embodiment of the disclosure.

FIG. 12 is a flow chart illustrating a method for defining an instruction path to be compiled by a JIT compiler according to one embodiment of the disclosure. A method 1200 may begin at block 1202 with interpreting a first non-native instruction to generate a first instruction code. At block 1204, a plurality of instruction codes reachable by the first instruction code may be identified. The plurality of instruction codes may include one or more instruction codes. The method 1200 may include, at block 1206, assigning to a first group of instruction codes the first instruction code and the identified plurality of instruction codes. At block 1208, the first group of instruction codes may be compiled to generate a native instruction path.

According to another embodiment, a method for defining an instruction path to be compiled by a JIT compiler may also include identifying a second instruction code from the plurality of instruction codes that satisfies a criteria for terminating an instruction code path. In some embodiments, no instruction code in the plurality of instruction codes branched to after the second instruction code may be assigned to the first group of instructions. With the second instruction code serving as the path terminating instruction code, the generated native instruction path may start with a native instruction corresponding to the first instruction code and may end with a native instruction corresponding to the second instruction code.

In some embodiments, the criteria for terminating an instruction code path may include at least one of a state transition, an instruction code that generates an interrupt, and a complex instruction. In some embodiments, at block 510, instruction codes located in shadow memory may be processed with a JIT compiler to generate compiled native instructions. For example, in one embodiment, an instruction code in shadow memory may be compiled with the JIT compiler to generate a native instruction that can be directly executed by an execution engine. In another embodiment, the dynamic translator may include functionality to restrict the compilation, by the JIT compiler, of an instruction considered complex or infrequent, or an instruction necessary for proper operation of the translator itself. A complex instruction may include, for example, any operation with multiple storage operands or is otherwise not a simple data movement or simple calculation. Examples of instructions for operation of the translator itself may, in some embodiments, include instructions used to trigger high level JIT compiler behavior, such as path starts or ends or actions for which the JIT compiler may not have sufficient data structures to handle. Based on the configuration of the dynamic translator, the execution engine may execute, at block 512, the native code fragments pointed to by the instruction codes or the execution engine may execute the compiled native instructions generated by the JIT compiler. Furthermore, identifying a second instruction code that satisfies the criteria may include at least one of determining that the second instruction code causes a computing system to perform the state transition, determining that the second instruction code generates an interrupt, and determining that the non-native instruction corresponding to the second instruction code is a complex instruction.

According to one embodiment, a method for defining an instruction path to be compiled by a JIT compiler may also include determining the number of instruction codes in the first group of instruction codes. A method may further include defining a maximum number of instruction codes for an instruction code path and determining if the number of instruction codes in the first group of instruction codes exceeds the defined maximum number of instruction codes for the instruction code path. If it is determined that the number of instruction codes in the first group of instruction codes exceeds the maximum number of instruction codes for the instruction code path then, at most, the maximum number of instruction codes may be assigned to the first group of instruction codes while the instruction codes from the plurality of instruction codes that are not assigned to the first group of instruction codes may be assigned to a second group of instruction codes.

According to yet another embodiment, a method for defining an instruction path to be compiled by a JIT compiler may also include identifying a conditional jump instruction in the native instruction path and determining if the conditional jump instruction indicates that an instruction jump should occur. If it is determined that the conditional jump instruction indicates that an instruction jump should occur, then the method may also include interpreting a second non-native instruction corresponding to a native instruction to which the conditional jump instruction indicates a jump should occur to generate a third instruction code. The third instruction code may be assigned to the first group of instruction codes, and the first group of instruction codes may be recompiled to generate an updated native instruction path. By allowing the native instruction path to be updated as just described, the native instruction path is capable of dynamically growing in size at runtime.

Figure 13:
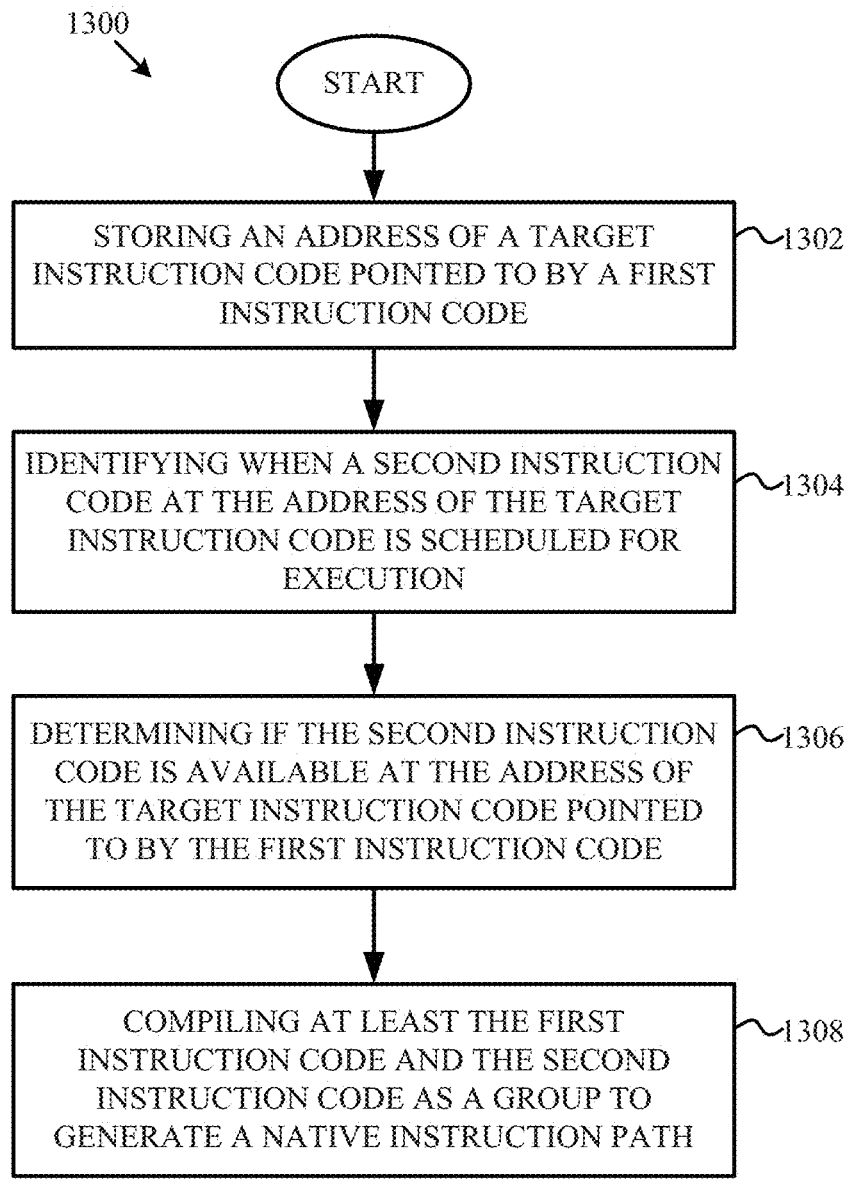
FIG. 13 is a flow chart illustrating a method for implementing a jump instruction in a dynamic translator using instruction code translation and just-in-time compilation according to one embodiment of the disclosure.

FIG. 13 is a flow chart illustrating a method for implementing a jump instruction in a dynamic translator using instruction code translation and just-in-time (JIT) compilation according to one embodiment of the disclosure. A method 1300 begins at block 1302 with storing an address of a target instruction code pointed to by a first instruction code, where the address corresponds an address in a shadow memory. At block 1304, the method 1300 may include identifying when a second instruction code at the address of the target instruction code is scheduled for execution. The method 1300 may also include, at block 1306, determining if the second instruction code is available at the address of the target instruction code pointed to by the first instruction code. At block 1308, the method 1300 may compile at least the first instruction code and the second instruction code as a group to generate a native instruction path if it is determined that the second instruction code is available at the address of the target instruction code. The native instruction path may include at least a first native instruction corresponding to the first instruction code and a second native instruction corresponding to the second instruction code, although the native instruction path may include many more instruction codes.

If is determined that the second instruction code is not available at the address of the target instruction code, such as at block 1306, a method for implementing a jump instruction in a dynamic translator using instruction code translation and just-in-time compilation may also include interpreting a non-native instruction corresponding to the second instruction code to generate the second instruction code and compiling at least the first instruction code and the second instruction code as a group to generate the native instruction path. In some embodiments, the native instruction path may include at least a first native instruction corresponding to the first instruction code and a second native instruction corresponding to the second instruction code.

In one embodiment, the target instruction code may be the target instruction code for a plurality of instruction codes and the first instruction code may point to a plurality of target instruction codes. As an example, a subroutine may be called from many different instructions, and the return from the subroutine may go to any one of those different instructions. Therefore, a method for implementing a jump instruction in a dynamic translator using instruction code translation and just-in-time compilation may also include, in another embodiment, defining a maximum number of target instruction codes for the first instruction code and compiling no more than the maximum number of target instruction codes with the first instruction code to generate the native instruction path. Compiling no more than the maximum number of target instruction codes with the first instruction code to generate the native instruction path may, in some embodiments, prevent an extremely long native instruction path from being generated, which may consume a significant amount of time to generate.

Figure 14:
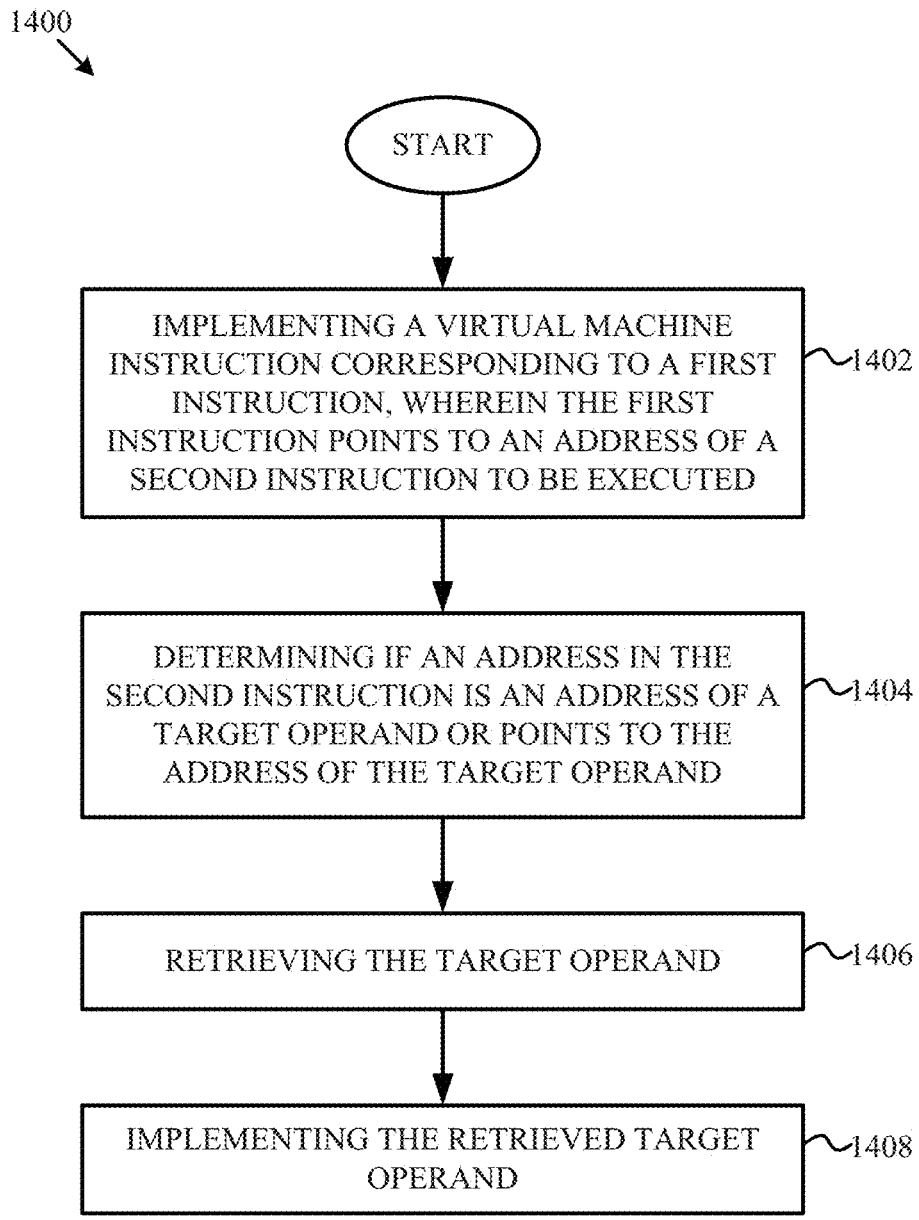
FIG. 14 is a flow chart illustrating a method for implementing an indirect operand instruction in a dynamic translator using instruction code translation and just-in-time compilation according to one embodiment of the disclosure.

FIG. 14 is a flow chart illustrating a method for implementing an indirect operand instruction in a dynamic translator using instruction code translation and just-in-time compilation according to one embodiment of the disclosure. Method 1400 may begin at block 1402 with implementing a virtual machine instruction corresponding to a first instruction, where the first instruction points to an address of a second instruction to be executed. Method 1400 may also include, at block 1404, determining if an address in the second instruction is an address of a target operand or points to the address of the target operand. Block 1404 may be completed by determining the value of a bit in the second instruction.

At block 1406, the target operand may be retrieved based, at least in part, on determining if the address in the second instruction is the address of the target operand or points to the address of the target operand. According to one embodiment, the target instruction may be retrieved from either the address in the second instruction or the address pointed to by the address in the second instruction. At block 1408, the retrieved target operand may be implemented. In one embodiment, the address of the second instruction, the address in the second instruction, and the address of the target operand may be addresses in shadow memory, non-native memory, and/or native memory.

Figure 15:
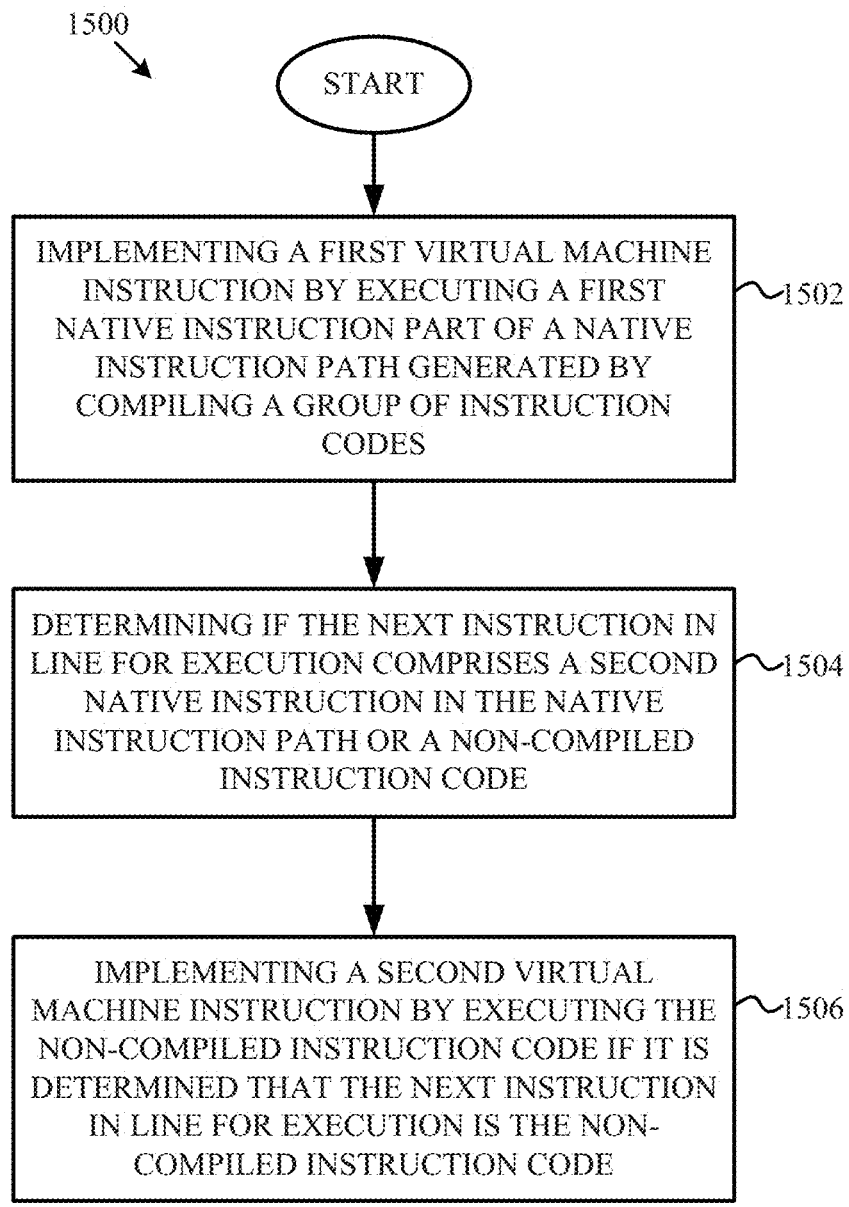
FIG. 15 is a flow chart illustrating a method for executing a non-compiled instruction code during execution of a compiled instruction path according to one embodiment of the disclosure.

FIG. 15 is a flow chart illustrating a method for executing a non-compiled instruction code during execution of a compiled instruction path according to one embodiment of the disclosure. The method 1500 may begin at block 1502 with implementing a first virtual machine instruction by executing a first native instruction part of a native instruction path generated by compiling a group of instruction codes. Method 1500 may also include, at block 1504, determining if the next instruction in line for execution includes a second native instruction in the native instruction path or a non-compiled instruction code. At block 1506, a second virtual machine instruction may be implemented by executing the non-compiled instruction code if it is determined that the next instruction in line for execution is the non-compiled instruction code.

Although not shown, the method 1500 may also include transferring execution of instructions to implement virtual machine instructions from the compiled native instruction path to the direct instruction code translator if it is determined that the next instruction in line for execution is the non-compiled instruction code. Additionally or alternatively, the method 1500 may further include implementing a third virtual machine instruction by executing the second native instruction in the native instruction path after implementing the second virtual machine instruction. Therefore, execution of instructions to implement virtual machine instructions may also be transferred from the direct instruction code translator to the compiled native instruction path after implementing the second virtual machine instruction.

A method for executing a non-compiled instruction code during execution of a compiled instruction path may include implementing a second virtual machine instruction by executing the second native instruction in the native instruction path if it is determined that the next instruction in line for execution is the second native instruction and implementing a third virtual machine instruction by executing a third native instruction in the native instruction path after implementing the second virtual machine instruction. According to one embodiment, a shadow memory may be accessed from which the non-compiled instruction code may be retrieved upon determining that the next instruction in line for execution is the non-compiled instruction code.

Figure 16:
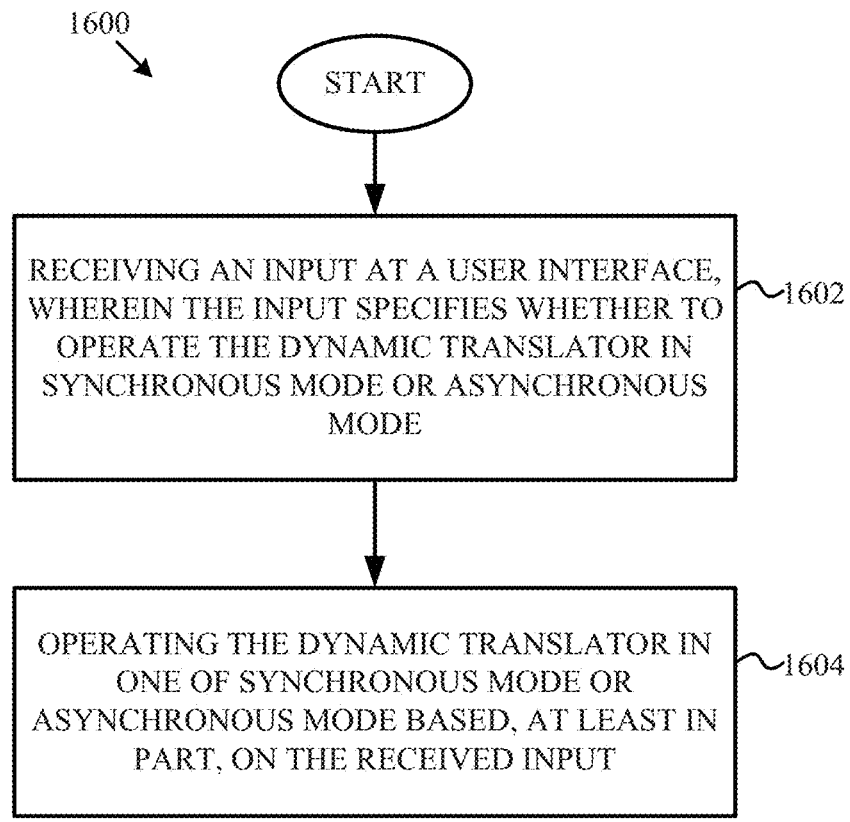
FIG. 16 is a flow chart illustrating a method for synchronously and asynchronously operating a dynamic translator according to one embodiment of the disclosure.

FIG. 16 is a flow chart illustrating a method for synchronously and asynchronously operating a dynamic translator according to one embodiment of the disclosure. A method 1600 may start at block 1602 with receiving an input at a user interface, where the input specifies whether to operate the dynamic translator in synchronous mode or asynchronous mode. At block 1604, the dynamic translator may be operated in one of synchronous mode or asynchronous mode based, at least in part, on the received input.

In synchronous operation, the dynamic translator may execute a first number of instruction codes generated by interpreting non-native instructions and storing the result of the execution of the first number of instruction codes. After storing the result, the first number of instruction codes may be compiled with a JIT compiler to generate a first number of native instructions corresponding to the first number of instruction codes. The state of execution of the dynamic translator may then be reset to correspond to the state of execution of the dynamic translator immediately prior to the execution of the first number of instruction codes with the dynamic translator. After resetting the state of execution, the dynamic translator may then execute the first number of native instructions. The result of the execution of the first number of native instructions may be read and then compared to the stored result of the execution of the first number of instruction codes to identify errors. For example, an error may be identified if after comparing the results it is determined that the results do not match.

In asynchronous operation, the dynamic translator may execute a first number of instruction codes generated by interpreting non-native instructions and compiling the first number of instruction codes with a JIT compiler to generate a first number of native instructions corresponding to the first number of instruction codes. Upon reaching an instruction code in line for execution that has already been compiled with the JIT compiler, a native instruction corresponding to the instruction code and generated by compiling the instruction code may be executed. To identify errors, the execution of the dynamic translator in asynchronous mode may be monitored. In asynchronous mode, the compiling of the first number of instruction codes with a JIT compiler may be performed in parallel with the executing of the first number of instruction codes or the first number of native instructions corresponding to the first number of instruction codes.

In some embodiments, the method 1600 may also include monitoring the operation of the dynamic translator being operated in one of synchronous mode or asynchronous mode. In addition, the method 1600 may further include executing with the dynamic translator a combination of instructions including a plurality of instruction codes generated by interpreting a plurality of non-native instructions and a plurality of compiled native instructions generated by compiling the plurality of instruction codes.

Figure 17:
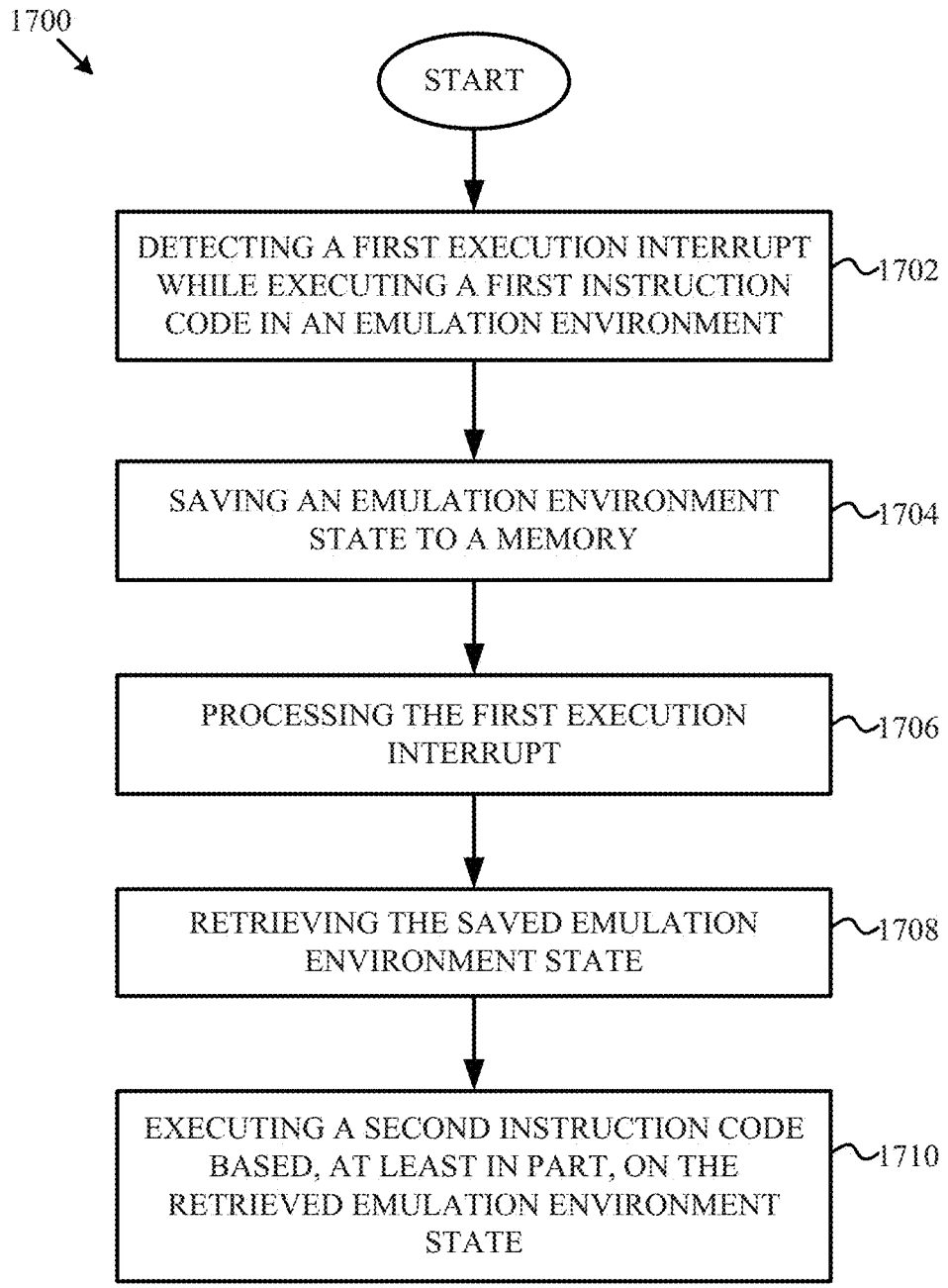
FIG. 17 is a flow chart illustrating a method for handling an execution interrupt in a dynamic translator according to one embodiment of the disclosure.

FIG. 17 is a flow chart illustrating a method for handling an execution interrupt in a dynamic translator according to one embodiment of the disclosure. A method 1700 may start at block 1702 with detecting a first execution interrupt while executing a first instruction code in an emulation environment. In one example, the first execution interrupt may correspond to an interrupt associated with the hardware and/or an interrupt associated with the emulation environment. In another example, the first execution interrupt may be an instruction in non-native memory, such as a non-native instruction, an instruction in shadow memory, such as an instruction code, or an instruction in native memory, such as a compiled instruction. In other examples, instruction codes executed in an emulation environment may be generated by interpreting non-native instructions, and the dynamic translator may execute the plurality of instruction codes in the emulation environment. The dynamic translator may also execute a plurality of compiled native instructions generated by compiling the plurality of instruction codes.

At block 1704, method 1700 may save the emulation environment state to a memory. The emulation environment state may provide information associated with the interrupted first instruction code. For example, the saved emulation environment state may provide information identifying the location, within the first instruction code, at which the first instruction code was interrupted.

The method 1700 may also include, at block 1706, processing the first execution interrupt instruction that interrupted the execution of the first instruction code. For example, a non-native instruction associated with the first execution interrupt instruction may be retrieved from non-native memory and interpreted to generate an interrupt instruction code corresponding to the first execution interrupt instruction. The interrupt instruction code may be subsequently executed. In another example, an instruction code corresponding to the first execution interrupt instruction may be retrieved from the shadow memory and subsequently executed. In yet another example, a native instruction corresponding to the first execution interrupt instruction may be retrieved from native memory and subsequently executed.

In some embodiments, an interrupt instruction may also be interrupted. For example, a second execution interrupt may be detected while processing the first execution interrupt. In some embodiments, the first execution interrupt may have higher priority than the second interrupt, therefore processing of the first execution interrupt continues despite the detection of the second execution interrupt. The second interrupt may then be processed after the processing of the first execution interrupt has been completed or the second interrupt may be held in a pending state until it has higher priority than an instruction being executed. According to another embodiment, the second execution interrupt may have a higher priority than the first execution interrupt. If the second execution interrupt has a higher priority than the first execution interrupt, then the execution state associated with the first execution interrupt may be saved to memory, and the second execution interrupt may be processed. After processing the second execution interrupt, the saved state associated with the first execution interrupt may be retrieved, and the first execution interrupt may be processed based, at least in part, on the retrieved state associated with the first execution interrupt. According to another embodiment, the first interrupt may be held in a pending state until it has higher priority than an instruction being executed.

At block 1708, the saved emulation environment state may be retrieved. At block 1710, a second instruction code may be executed based, at least in part, on the retrieved emulation environment state. For example, the second instruction code may correspond to the interrupted first instruction code, and retrieving the saved emulation environment state may correspond to retrieving information related to where the first instruction code was interrupted. If the second instruction code corresponds to the interrupted first instruction code, then executing the second instruction code based on the retrieved emulation environment state, such as at block 1710, may cause execution of the instruction codes to resume at the state in the emulation environment where execution was interrupted, such as during the execution of the first instruction code. Furthermore, because the second instruction code corresponds to the first instruction code, the instruction code corresponding to a non-native instruction for the second instruction code already exists in shadow memory (i.e., the second instruction code is the first instruction code in shadow memory). Therefore, executing the second instruction code based on the retrieved emulation environment state, such as at block 1710, may avoid fetching and interpreting a non-native instruction associated with the second instruction code to resume execution in the emulation environment.

According to another embodiment, the second instruction code may correspond to a different instruction code than the interrupted first instruction code. If the second instruction code corresponds to a different instruction code than the interrupted first instruction code, then execution of the second instruction code, such as at block 1710, may commence at a different location than the location, within the first instruction code, at which the first instruction code was interrupted.

Figure 18:
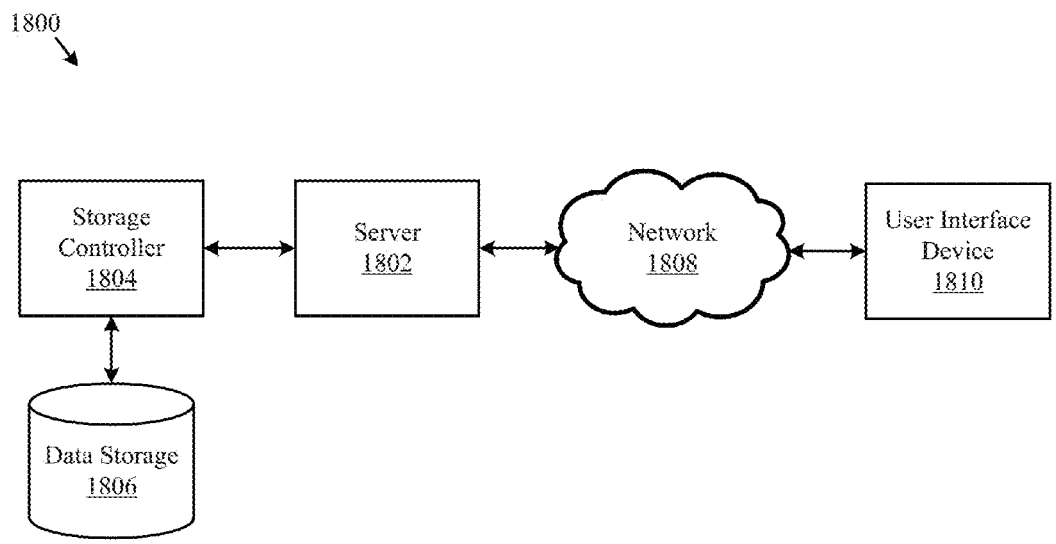
FIG. 18 is a block diagram illustrating a computer network according to one embodiment of the disclosure.

FIG. 18 illustrates one embodiment of a system 1800 for an information system, including a system for executing non-native instructions in a computing system having a processor configured to execute native instructions. The system 1800 may include a server 1802, a data storage device 1806, a network 1808, and a user interface device 1810. The server 1802 may also be a hypervisor-based system executing one or more guest partitions hosting operating systems with modules having server configuration information. In a further embodiment, the system 1800 may include a storage controller 1804, or a storage server configured to manage data communications between the data storage device 1806 and the server 1802 or other components in communication with the network 1808. In an alternative embodiment, the storage controller 1804 may be coupled to the network 1808.

In one embodiment, the user interface device 1810 is referred to broadly and is intended to encompass a suitable processor-based device such as a desktop computer, a laptop computer, a personal digital assistant (PDA) or tablet computer, a smartphone or other mobile communication device having access to the network 1808. When the device 1810 is a mobile device, sensors (not shown), such as a camera or accelerometer, may be embedded in the device 1810. When the device 1810 is a desktop computer the sensors may be embedded in an attachment (not shown) to the device 1810. In a further embodiment, the user interface device 1810 may access the Internet or other wide area or local area network to access a web application or web service hosted by the server 1802 and may provide a user interface for enabling a user to enter or receive information.

The network 1808 may facilitate communications of data between the server 1802 and the user interface device 1810. The network 1808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 19:
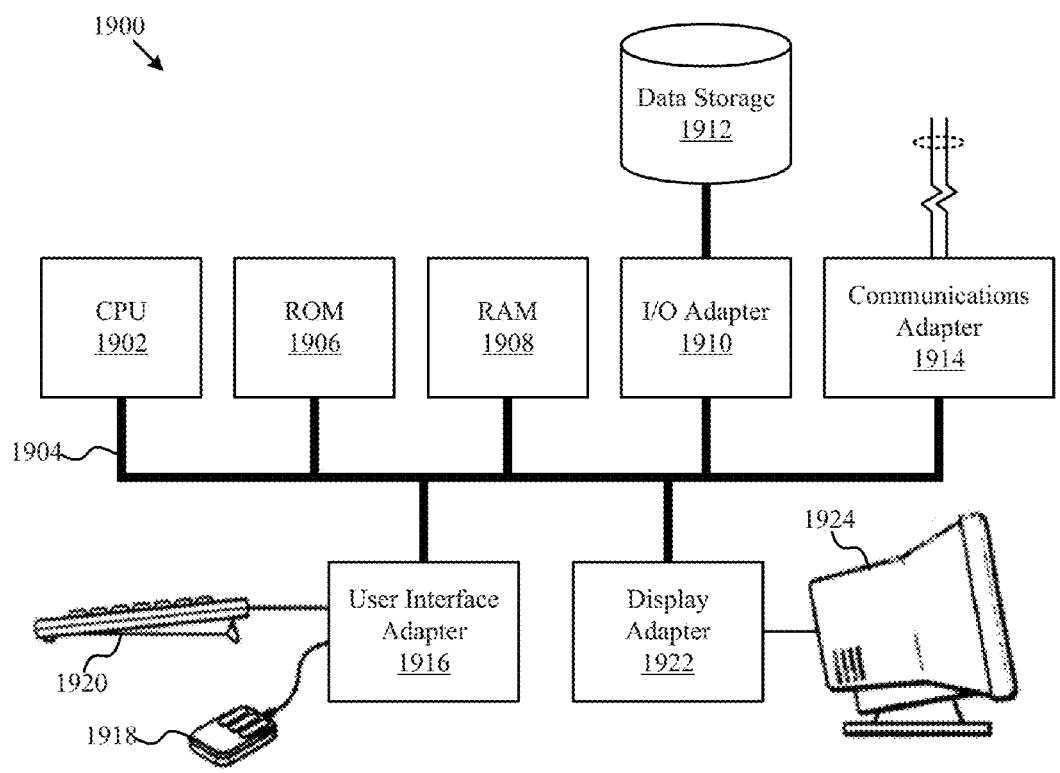
FIG. 19 is a block diagram illustrating a computer system according to one embodiment of the disclosure.

FIG. 19 illustrates a computer system 1900 adapted according to certain embodiments of the server 1802 and/or the user interface device 1810. The central processing unit ("CPU") 1902 is coupled to the system bus 1904. The CPU 1902 may be a general purpose CPU or microprocessor, graphics processing unit ("GPU"), and/or microcontroller. The present embodiments are not restricted by the architecture of the CPU 1902 so long as the CPU 1902, whether directly or indirectly, supports the operations as described herein. The CPU 1902 may execute the various logical instructions according to the present embodiments.

The computer system 1900 also may include random access memory (RAM) 1908, which may be synchronous RAM (SRAM), dynamic RAM (DRAM), synchronous dynamic RAM (SDRAM), or the like. The computer system 1900 may utilize RAM 1908 to store the various data structures used by a software application. The computer system 1900 may also include read only memory (ROM) 1906 which may be PROM, EPROM, EEPROM, optical storage, or the like. The ROM may store configuration information for booting the computer system 1900. The RAM 1908 and the ROM 1906 hold user and system data, and both the RAM 1908 and the ROM 1906 may be randomly accessed.

The computer system 1900 may also include an input/output (I/O) adapter 1910, a communications adapter 1914, a user interface adapter 1916, and a display adapter 1922. The I/O adapter 1910 and/or the user interface adapter 1916 may, in certain embodiments, enable a user to interact with the computer system 1900. In a further embodiment, the display adapter 1922 may display a graphical user interface (GUI) associated with a software or web-based application on a display device 1924, such as a monitor or touch screen.

The I/O adapter 1910 may couple one or more storage devices 1912, such as one or more of a hard drive, a solid state storage device, a flash drive, a compact disc (CD) drive, a floppy disk drive, and a tape drive, to the computer system 1900. According to one embodiment, the data storage 1912 may be a separate server coupled to the computer system 1900 through a network connection to the I/O adapter 1910. The communications adapter 1914 may be adapted to couple the computer system 1900 to the network 1808, which may be one or more of a LAN, WAN, and/or the Internet. The user interface adapter 1916 couples user input devices, such as a keyboard 1920, a pointing device 1918, and/or a touch screen (not shown) to the computer system 1900. The display adapter 1922 may be driven by the CPU 1902 to control the display on the display device 1924. Any of the devices 1902-1922 may be physical and/or logical.

The applications of the present disclosure are not limited to the architecture of computer system 1900. Rather the computer system 1900 is provided as an example of one type of computing device that may be adapted to perform the functions of the server 1802 and/or the user interface device 1810. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 1900 may be virtualized for access by multiple users and/or applications.

Figure 20A:
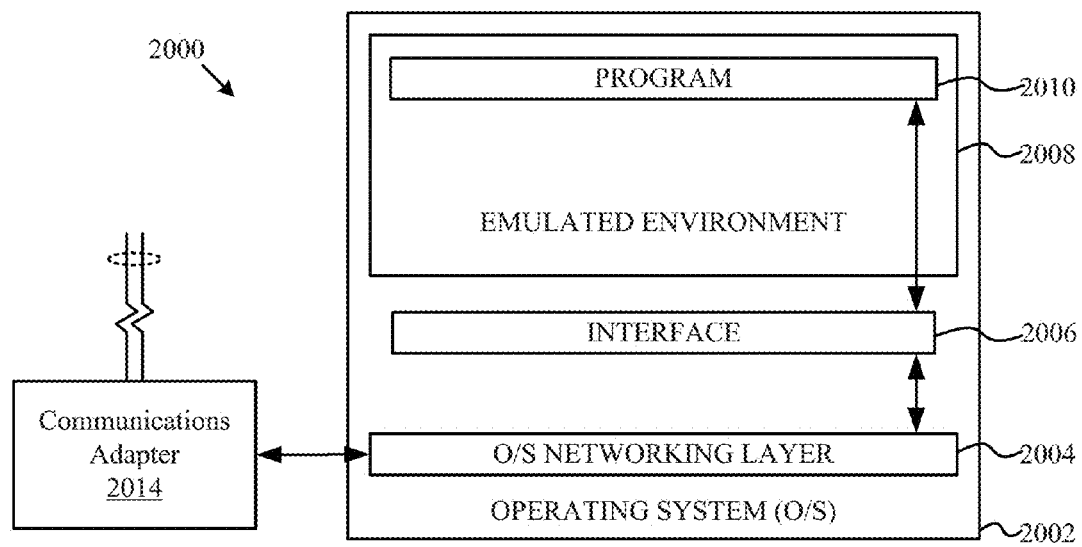
FIG. 20A is a block diagram illustrating a server hosting an emulated software environment for virtualization according to one embodiment of the disclosure.

FIG. 20A is a block diagram illustrating a server hosting an emulated software environment for virtualization according to one embodiment of the disclosure. An operating system 2002 executing on a server includes drivers for accessing hardware components, such as a networking layer 2004 for accessing the communications adapter 2014. The operating system 2002 may be, for example, Linux. An emulated environment 2008 in the operating system 2002 executes a program 2010, such as Communications Platform (CPComm) or Communications Platform for Open Systems (CPCommOS). The program 2010 accesses the networking layer 2004 of the operating system 2002 through a non-emulated interface 2006, such as extended network input output processor (XNIOP). The non-emulated interface 2006 translates requests from the program 2010 executing in the emulated environment 2008 for the networking layer 2004 of the operating system 2002.

Figure 20B:
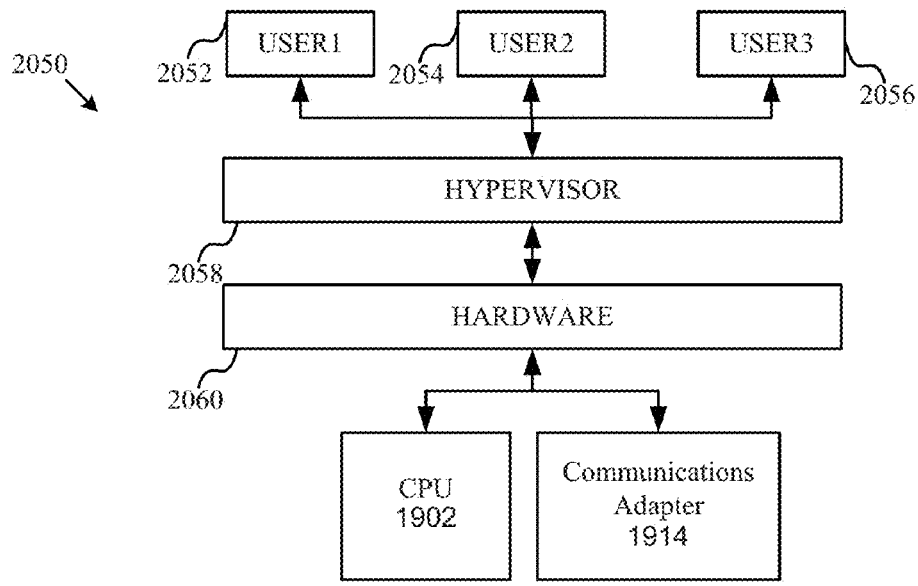
FIG. 20B is a block diagram illustrating a server hosting an emulated hardware environment according to one embodiment of the disclosure.

In another example, hardware in a computer system may be virtualized through a hypervisor. FIG. 20B is a block diagram illustrating a server hosting an emulated hardware environment according to one embodiment of the disclosure. Users 2052, 2054, 2056 may access the hardware 2060 through a hypervisor 2058. The hypervisor 2058 may be integrated with the hardware 2060 to provide virtualization of the hardware 2060 without an operating system, such as in the configuration illustrated in FIG. 20A. The hypervisor 2058 may provide access to the hardware 2060, including the CPU 1902 and the communications adaptor 1914.

Referring now to FIGS. 1-20 overall, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can also be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium can include any medium that includes media capable of containing or storing the program for use by or in connection with the instruction execution system, apparatus, or device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for dynamically turning on or off just-in-time compilation in a dynamic translator using instruction code translation, comprising:
   fetching a non-native instruction from a plurality of non-native instructions;
   interpreting the non-native instruction to generate an instruction code;
   determining if the instruction code satisfies a criteria which prohibits compilation of the instruction code; and
   when the criteria is determined to be satisfied:
     prohibiting compilation of the instruction code; and
     implementing a virtual machine instruction corresponding to the non-native instruction based, at least in part, on the instruction code if the criteria is determined to be satisfied;
   wherein the criteria comprises a range of addresses in at least one of a shadow memory associated with the plurality of non-native instructions and a non-native memory, and the step of determining if the criteria is satisfied comprises at least one of determining if the instruction code is located within the range of addresses in the shadow memory and determining if the non-native instruction is located within the non-native memory.

2. The method of claim 1, wherein the criteria comprises a type of instruction, and determining if the criteria is satisfied comprises determining if the instruction code is associated with the type of instruction.

3. The method of claim 1, further comprising:
   prohibiting compilation of the instruction code based on user input specifying that compilation of the instruction code is prohibited; and
   allowing compilation of the instruction code based on user input specifying that compilation of the instruction code is allowed.

4. The method of claim 1, wherein the step of implementing a virtual machine instruction corresponding to the non-native instruction based on the instruction code comprises:
   locating a native code fragment pointed to by the instruction code; and
   executing the native code fragment.

5. The method of claim 1, further comprising:
   compiling the instruction code to generate a native instruction corresponding to the non-native instruction if the criteria is determined to not be satisfied; and
   implementing a virtual machine instruction corresponding to the non-native instruction based on the generated native instruction if the criteria is determined to not be satisfied.

6. The method of claim 5, wherein implementing a virtual machine instruction corresponding to the non-native instruction based on the generated native instruction comprises:
   replacing a branch address pointed to by the instruction code with an address of the generated native instruction;
   locating the native instruction pointed to by the instruction code; and
   executing the native instruction.

7. A computer program product for dynamically turning on or off just-in-time compilation in a dynamic translator using instruction code translation, comprising:
   a non-transitory computer-readable medium comprising:
     code to fetch a non-native instruction from a plurality of non-native instructions;
     code to interpret the non-native instruction to generate an instruction code;
     code to determine if the instruction code satisfies a criteria which prohibits compilation of the instruction code;
     code to prohibit compilation of the instruction code if the criteria is determined to be satisfied; and
     code to implement a virtual machine instruction corresponding to the non-native instruction based on the instruction code if the criteria is determined to be satisfied;
   wherein the criteria comprises a range of addresses in at least one of a shadow memory associated with the plurality of nonnative instructions and a non-native memory, and code to determine if the criteria is satisfied comprises code to at least one of determine if the instruction code is located within the range of addresses in the shadow memory and determine if the non-native instruction is located within the non-native memory.

8. The computer program product of claim 7, wherein the criteria comprises a type of instruction, and code to determine if the criteria is satisfied comprises code to determine if the instruction code is associated with the type of instruction.

9. The computer program product of claim 7, wherein the medium further comprises:
   code to prohibit compilation of the instruction code based on user input specifying that compilation of the instruction code is prohibited; and
   code to allow compilation of the instruction code based on user input specifying that compilation of the instruction code is allowed.

10. The computer program product of claim 7, wherein code to implement a virtual machine instruction corresponding to the non-native instruction based on the instruction code comprises:
- code to locate a native code fragment pointed to by the instruction code; and
- code to execute the native code fragment.

11. The computer program product of claim 7, wherein the medium further comprises:
- code to compile the instruction code to generate a native instruction corresponding to the non-native instruction if the criteria is determined to not be satisfied; and
- code to implement a virtual machine instruction corresponding to the non-native instruction based on the generated native instruction if the criteria is determined to not be satisfied.

12. The computer program product of claim 11, wherein code to implement a virtual machine instruction corresponding to the non-native instruction based on the generated native instruction comprises:
- code to replace a branch address pointed to by the instruction code with an address of the generated native instruction;
- code to locate the native instruction pointed to by the instruction code; and code to execute the native instruction.

13. An apparatus for dynamically turning on or off just-in-time compilation in a dynamic translator using instruction code translation, comprising:
- a processor; and
- a memory coupled to the processor, in which the processor is configured:
  - to fetch a non-native instruction from a plurality of non-native instructions;
  - to interpret the non-native instruction to generate an instruction code;
  - to determine if the instruction code satisfies a criteria which prohibits compilation of the instruction code;
  - to prohibit compilation of the instruction code if the criteria is determined to be satisfied; and
  - to implement a virtual machine instruction corresponding to the non-native instruction based on the instruction code if the criteria is determined to be satisfied;
- wherein the criteria comprises a range of addresses in at least one of a shadow memory associated with the plurality of non-native instructions and a non-native memory, and the processor configured to determine if the criteria is satisfied comprises the processor being further configured to at least one of determine if the instruction code is located within the range of addresses in the shadow memory and determine if the non-native instruction is located within the non-native memory.

14. The apparatus of claim 13, wherein the criteria comprises a type of instruction, and the processor configured to determine if the criteria is satisfied comprises the processor being further configured to determine if the instruction code is associated with the type of instruction.

15. The apparatus of claim 13, wherein the processor is further configured:
- to prohibit compilation of the instruction code based on user input specifying that compilation of the instruction code is prohibited; and
- to allow compilation of the instruction code based on user input specifying that compilation of the instruction code is allowed.

16. The apparatus of claim 13, wherein the processor configured to implement a virtual machine instruction corresponding to the non-native instruction based on the instruction code comprises the processor being further configured:
- to locate a native code fragment pointed to by the instruction code; and
- to execute the native code fragment.

17. The apparatus of claim 13, wherein the processor is further configured to:
- to compile the instruction code to generate a native instruction corresponding to the non-native instruction if the criteria is determined to not be satisfied; and
- to implement a virtual machine instruction corresponding to the non-native instruction based on the generated native instruction if the criteria is determined to not be satisfied, wherein the processor configured to implement a virtual machine instruction corresponding to the non-native instruction based on the generated native instruction comprises the processor being configured:
  - to replace a branch address pointed to by the instruction code with an address of the generated native instruction;
  - to locate the native instruction pointed to by the instruction code; and
  - to execute the native instruction.

* * * * *